US010183879B2

(12) United States Patent
Piedra-Garza et al.

(10) Patent No.: US 10,183,879 B2
(45) Date of Patent: *Jan. 22, 2019

(54) METHOD FOR REMOVING MERCURY AND SELENIUM FROM SULFATE-CONTAINING WASTE WATER

(71) Applicant: Steag Energy Services GmbH, Essen (DE)

(72) Inventors: Luis Fernando Piedra-Garza, Essen (DE); Thomas Lauer, Essen (DE); Magdalena Hilger, Köln (DE)

(73) Assignee: STEAG ENERGY SERVICES GMBH, Essen (DE)

( * ) Notice: Subject to any disclaimer, the term of this patent is extended or adjusted under 35 U.S.C. 154(b) by 531 days.

This patent is subject to a terminal disclaimer.

(21) Appl. No.: 14/303,657

(22) Filed: Jun. 13, 2014

(65) Prior Publication Data
US 2014/0367335 A1 Dec. 18, 2014

(30) Foreign Application Priority Data

Jun. 14, 2013 (EP) ..................................... 13171997
Aug. 23, 2013 (EP) ..................................... 13181513

(51) Int. Cl.
*C09F 9/00* (2006.01)
*B03D 3/06* (2006.01)
(Continued)

(52) U.S. Cl.
CPC ................ *C02F 9/00* (2013.01); *B01D 21/01* (2013.01); *B01J 47/00* (2013.01); *B03D 3/06* (2013.01);
(Continued)

(58) Field of Classification Search
None
See application file for complete search history.

(56) References Cited

U.S. PATENT DOCUMENTS 5,853,598 A * 12/1998 Ogoshi ................ B01D 53/501
210/683
6,235,204 B1 * 5/2001 Castaldi .................... C02F 9/00
210/719
(Continued)

FOREIGN PATENT DOCUMENTS

DE   20 25 389 A1   3/1971
DE   43 33 739 A1   6/1994
(Continued)

OTHER PUBLICATIONS

Higgins et al. ("Flue Gas Desulfurization Wastewater Treatment Primer", Power Mag., 2009, pp. 1-17).*
(Continued)

*Primary Examiner* — Clare M Perrin
(74) *Attorney, Agent, or Firm* — Alston & Bird LLP

(57) ABSTRACT

The invention is directed to a method for the removal of mercury and selenium from sulfate-containing waste water. The method may include the following steps: a) a mercury- and selenium-contaminated waste water with a known sulfate concentration is provided, b) barium sulfate ($BaSO_4$) is precipitated from the provided waste water by the addition of a predefined amount of $Ba^{2+}$ ions to the waste water, c) $BaSO_4$ (if necessary together with other solids) is separated obtaining a low-solid waste water, d) the low-solid waste water is fed to an ion exchanger for the removal of mercury obtaining a waste water with a reduced mercury content, e) selenium and/or selenium compounds are removed from the waste water with the reduced mercury content and f) a sulfate-containing solution or solid is added to the waste water with a reduced selenium and/or selenium compound content in order to precipitate barium sulfate.

81 Claims, 5 Drawing Sheets

(51) Int. Cl.
  *B01J 47/00* (2017.01)
  *B01D 21/01* (2006.01)
  *C02F 1/42* (2006.01)
  *C02F 1/52* (2006.01)
  *C02F 9/00* (2006.01)
  *C02F 101/20* (2006.01)
  *C02F 1/28* (2006.01)
  *C02F 101/10* (2006.01)
  *C02F 1/44* (2006.01)

(52) U.S. Cl.
  CPC .............. *C02F 1/42* (2013.01); *C02F 1/5245* (2013.01); *C02F 1/281* (2013.01); *C02F 1/283* (2013.01); *C02F 1/286* (2013.01); *C02F 1/441* (2013.01); *C02F 1/442* (2013.01); *C02F 2001/422* (2013.01); *C02F 2101/106* (2013.01); *C02F 2101/20* (2013.01); *C02F 2209/06* (2013.01)

(56) References Cited

U.S. PATENT DOCUMENTS

| | | | |
|---|---|---|---|
| 2008/0197075 | A1 | 8/2008 | Musale et al. |
| 2011/0174743 | A1* | 7/2011 | Huang .................... C02F 1/705 210/758 |
| 2011/0233139 | A1* | 9/2011 | Maree ...................... C02F 1/66 210/726 |
| 2011/0247312 | A1* | 10/2011 | Bookbinder ........... B01D 15/00 60/39.12 |
| 2012/0296147 | A1* | 11/2012 | Swearingen .............. C02F 9/00 588/318 |
| 2013/0334134 | A1 | 12/2013 | Mierzejewski et al. |
| 2014/0367335 | A1 | 12/2014 | Garza et al. |

FOREIGN PATENT DOCUMENTS

| | | |
|---|---|---|
| EP | 0 205 976 A2 | 12/1986 |
| GB | 2 098 186 A | 11/1982 |
| JP | 2003-236334 A | 8/2003 |
| JP | 2010-088991 A | 4/2010 |
| WO | WO 2000/076917 A1 | 12/2000 |
| WO | WO 2012/040525 A1 | 3/2012 |

OTHER PUBLICATIONS

Owens et al. ("Trace Mercury Removal from Flue Gas Desulfurization Wastewater", IP.com, 2009, pp. 1-9).*

Boegel et al. (Selenium oxidation and removal by ion exchange:, published Mar. 1, 1986, accessed online at http://www.osti.gov/scitech/biblio/5592875 on Nov. 22, 2016, pp. 1-2).*

Higgins, Thomas E. et al. "Flue Gas Desulfurization Wastewater Treatment Primer." Power Mag, Jan. 3, 2009. <http://www.powermag.com/flue-gas-desulferization-wastewater-treatment-primer/?printmode=1>; last accessed Mar. 18, 2016.

International Preliminary Report on Patentability, Chapter II, for related International Application No. PCT/EP2014/001468, dated Jan. 19, 2016.

International Search Report and Written Opinion for related International Application No. PCT/EP2014/001468 dated Dec. 18, 2014.

International Search Report and Written Opinion for related International Application No. PCT/EP2014/002107 dated Oct. 28, 2014.

Owens, Mark et al. "Trace Mercury Removal From Flue Gas Desulfurization Wastewater." ip.com, Dec. 21, 2009, pp. 1-9.

* cited by examiner

METHOD FOR REMOVING MERCURY AND SELENIUM FROM SULFATE-CONTAINING WASTE WATER

CROSS REFERENCE TO RELATED APPLICATION

This application claims priority to EP Application No. 13171997.3, filed Jun. 14, 2013, and EP Application No. 13181513.6, filed Aug. 23, 2013, the entire contents of which are incorporated herein by reference.

FIELD

The present invention relates to a method for removing impurities from waste water, in particular a method for removing mercury and selenium from sulfate-containing waste water.

BACKGROUND

Industrial waste water contains a wide variety of pollutants that must be removed prior to the discharge of the waste water into the environment. A particularly toxic component in industrial waste water is the transition metal mercury. By means of flue gas desulfurization plants which are common in modern power plants that burn fossil fuels, mercury is removed from the combustion exhaust gases and finds its way into the waste water discharged from a flue gas desulfurization plant.

Selenium is an essential trace element, but in higher concentrations is very toxic, which is why there is an effort to remove selenium from waste water of industrial plants.

For example, in Germany, the discharge limit of mercury in the waste water of flue gas desulfurization plants is explicitly laid out in Waste Water Regulation 47, "Scrubbing of Flue Gases from Combustion Plants." In its current form, published on Jun. 14, 2004, the limit for mercury is pegged at 30 μg/L. Allowable discharge limits for selenium are not stipulated by the current aforementioned regulation.

In the United States efforts to curb the discharge limits of mercury and selenium in waste water from industrial facilities, particularly in conventional power plants, are already taking place. In many cases, these limits have been set at <12 ppt (ng/L) for mercury and <6 ppb (μg/L) for selenium.

It is therefore the objective of the present invention to provide the industry with a commercial economically feasible method for removing mercury and selenium from sulfate-containing waste water.

SUMMARY

The objective is achieved by a method, in which a) a mercury- and selenium-contaminated waste water with a known sulfate concentration is provided, b) barium sulfate (BaSO$_4$) is precipitated from the provided waste water by the addition of a predefined amount of Ba$^{2+}$ ions to the waste water, c) BaSO$_4$ (if necessary together with other solids) is separated obtaining a low-solid waste water, d) the low-solid waste water is fed to an ion exchanger for the removal of mercury obtaining a waste water with a reduced mercury content, e) selenium and/or selenium compounds are removed from the waste water with the reduced mercury content and f) a sulfate-containing solution or solid is added to the waste water with a reduced selenium and/or selenium compound content in order to precipitate barium sulfate.

DETAILED DESCRIPTION

Figure 1:
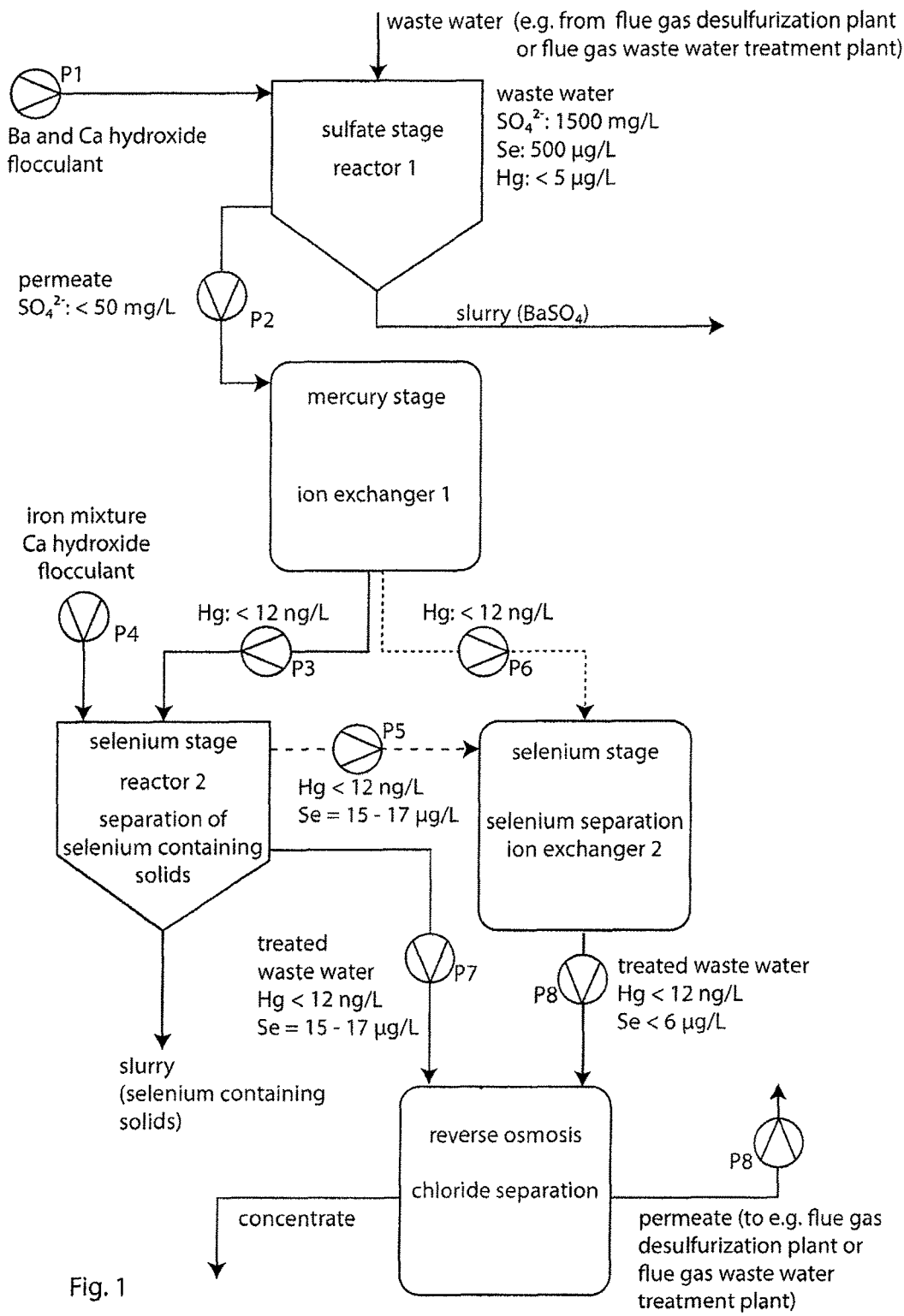
FIG. 1 shows a schematic flow of the semi-continuous process.

Surprisingly, it was determined that in accordance with the method of the invention mercury and selenium can be removed from sulfate-containing waste water in a relatively simple and economical manner. The sequence of the individual method steps of the present invention demonstrate that mercury and selenium can be removed from waste water containing sulfate in a cost-effective way without technically demanding method steps and in compliance with very strict concentration limits.

For this purpose, the sulfate concentration of the waste water is significantly lowered by the precipitation of barium sulfate in a first method stage (sulfate stage), wherein the reduction of the sulfate concentration makes the subsequent steps for the removal of mercury (mercury stage) and selenium (selenium stage) at all possible.

For the precipitation of barium sulfate to a given waste water whose sulfate concentration is known, a defined amount of Ba$^{2+}$ ions (for example, a solution of Ba$^{2+}$ of a known Ba$^{2+}$ concentration or a Ba$^{2+}$ containing water-soluble solid) is added to precipitate BaSO$_4$, which has an inherently low solubility product of $1.08 \times 10^{-10}$ mol$^2$/L$^2$. Since the concentration of sulfate and the concentration of the Ba$^{2+}$ containing solution as well as the Ba$^{2+}$ containing solid is known, exact stoichiometric values of barium can be dosed to the wastewater. If the sulfate concentration is not known or fluctuates greatly, it will be determined prior to process step a).

However, it is also possible to add more than the required stoichiometric amounts of barium, which will consequently prompt the precipitation of barium selenate, wherein its precipitation will be induced once elevated barium concentrations are reached in the waste water due to barium selenate's higher solubility product constant.

With the help of this sulfate precipitation (as BaSO$_4$), the waste water's overall sulfate concentration can be reduced to <50 mg/L.

For the precipitation of barium sulfate, the defined amount of Ba$^{2+}$ ions (i.e. a predetermined volume of a solution of known Ba$^{2+}$ concentration), which contains the stoichiometrically required (or slightly more than stoichiometrically required) amount of barium ions for the precipitation of the total amount of barium sulfate, can be added instantly to the waste water at a specific point in the process line to initiate the precipitation of total barium sulfate. In other words, the total amount of barium required for sulfate precipitation can be added at a single point in one process step in its entirety.

It has been determined, however, that the aforementioned procedure for the precipitation of sulfate is not the most efficient.

Generally, the removal of sulfate can be conducted on either a "semi-continuous" or "continuous basis".

The process can be semi-continuous in that a waste water volume, V1, is provided in a first reaction vessel, and the desired amount of Ba$^{2+}$ is added. After successful precipitation of barium sulfate (and possibly other solid precipitates) it is separated from the solution and the low-solid waste water is fed to the mercury removal stage.

As a continuous process, sulfate removal occurs by introducing a predetermined amount of $Ba^{2+}$ ions to the waste water at a defined location in (for example) a flow-through reactor where the precipitated solids formed upon the addition of $Ba^{2+}$ ions are then removed further downstream of the feed point.

Surprisingly, the precipitation of barium sulfate can be improved by, in the semi-continuous process, the addition of $Ba^{2+}$ ions (in solution or as solids) over a period of time t1. The precipitation of barium sulfate can be similarly improved in the continuous process by the introduction of $Ba^{2+}$ through process line x, in n parts at n different points in time, or is supplied to n different process line positions in which t, n, and x are determined by the waste water flow rate over time and its inherent sulfate concentration.

This type of $Ba^{2+}$ ions addition ensures that at the beginning of the dosing a concentration of $Ba^{2+}$ ions below the stoichiometric required amount of $Ba^{2+}$ is provided for the barium sulfate precipitation at a given single section of the process line or at a given point in time. Only during the addition of the last part or one of the last n parts the $Ba^{2+}$ ions concentration approaches the concentration of sulfate in the waste water. If $Ba^{2+}$ ions are added above the required stoichiometric dose in order to precipitate a portion of the selenium in the water as barium selenate, for one of the last n parts (most likely the last part) the $Ba^{2+}$ ions concentration is higher than the sulfate concentration for the specific time or the specific position along the process line respectively.

Regardless of whether the total amount of $Ba^{2+}$ ions is added at one point in time or at one given position along the process line, the resulting barium sulfate (as well as other inherent solids like barium selenate from the excess addition of barium) is precipitated and separated in one single process step.

Due to the possibility of variations in sulfate concentration of the waste water it cannot be ruled out that, due to a possible addition of excess $Ba^{2+}$ ions, the separated solid contains barium selenate, which contaminates the barium sulfate and makes the further use of the solid more difficult.

In a preferred embodiment of the invention it is provided that barium sulfate is separated after the addition of 1 to n parts of defined $Ba^{2+}$ ion amount(s). In other words, it is also provided to separate barium sulfate after, for example, each part or every other part.

Because of the differences in the solubility product of barium sulfate and barium selenate, it is this procedure that ensures that at the beginning of the addition of the predetermined amount of $Ba^{2+}$ ions, pure barium sulfate absent of any barium selenate is separated, so that it may be used further without any complicated purification. Only in the final separation step (or one of the final separation steps), and in case of an excess of barium ions, can it be assumed that traces of barium selenate are present in the separated solid.

In order to promote the precipitation of barium sulfate, it is preferred that after the addition of the defined amount of $Ba^{2+}$ ions or any n parts of this amount a pH greater than about 9.5, preferably between 11 and 12.5, is achieved by addition of hydroxide ions or compounds that form hydroxide ions in solution. This can be achieved by, for example, introducing a hydroxide-containing aqueous solution, a solid hydroxide, or compounds that form hydroxides such as CaO.

Preferably, the pH is adjusted by adding a suitable hydroxide-containing solution of the first and/or second main group elements of the periodic table. Some of the hydroxides of the first and second main groups are technically difficult to implement, or bases which are too weak to reach the desired pH range (i.e. hydroxides of Be and Mg).

In particular, the size of the flakes to be precipitated affects their ability to be separated from the solution, i.e. large flakes can be generally more readily separated than small flakes. It is therefore preferred that a pH from 11 to 12.5 (preferably 11.5 to 12.0) is adjusted using $Ca(OH)_2$, $Ca(OH)_2$ solution or a solid that forms $Ca(OH)_2$ in an aqueous solution (such as CaO). Surprisingly, it has been shown that the use of $Ca(OH)_2$, or an appropriate analogue solution, produces particularly large flakes of barium sulfate, which can be easily separated.

As mentioned previously, after mercury is removed from the solution by means of an ion exchanger, selenium is subsequently removed from the solution with the reduced mercury content. In a preferred embodiment of this invention this is achieved by adding a mixture of iron to the solution, subsequently adjusting the pH-value to between 6 and 8.5, preferably between 7.0 and 8.0, and separating selenium and/or selenium-containing solids from the solution.

In industrial waste water, selenium exists primarily in its sixth oxidation state (VI), such as selenate ion ($SeO_4^{2-}$). It is understood that selenate reacts with the iron or the iron mixture, presumably for the formation of inter alia $Fe^{II}_4 Fe^{III}_2 (OH)_{12} SeO_4 \times nH_2O$ which precipitates as a solid. If and when other selenium-containing solids or mixtures of solids are created is not yet clear exactly and not essential for the present invention.

Only after the precipitation of selenium or selenium-containing compounds can the waste water, which contains a significantly reduced concentration of sulfate, mercury, and selenium, be released to the environment.

Especially when processing large amounts of waste water, it is desirable to carry out the precipitation and separation of the different solids quickly.

Surprisingly, it was discovered that the precipitation of selenium and selenium-containing solids, respectively, takes place particularly rapidly when an iron mixture comprising iron (0), iron (II) and iron (III) compounds is added to the solution, wherein the Fe (0) preferably is in powder form. The mixing ratio of Fe (0), Fe (II) and Fe (III) depends on the specific concentration of selenium in the wastewater.

This invention provides a method for separation of selenium and selenium-containing solids, respectively, in a timeframe that is surprisingly less as compared to known methods and presents a more cost effective process.

In a preferred embodiment of the invention Fe (0), $FeCl_2$ and $FeCl_3$ are added to the solution, wherein it is irrelevant what type of ferric chloride is added (hydrous or anhydrous).

Particularly effective is the addition of the iron mixture as an aqueous suspension with Fe (0) and $FeCl_2$ and $FeCl_3$ in a weight ratio of 1:10:10 to the solution, wherein this weight ratio is based on the usual hydrous iron chlorides ($FeCl_2.4H_2O$, $FeCl_3.6H_2O$).

The precipitation of selenium or selenium-containing solids can be surprisingly and strongly influenced by the adjustment of the pH value. In a preferred embodiment of the invention the pH of the solution, after the addition of the mixture, is adjusted through the addition of hydroxide or hydroxide-forming compounds to a value between 6 and 8.5, preferably a pH between 7 and 8.0. When the pH is about 8.0, the best results are obtained. Therefore this is the most preferred pH value.

Utilizing the method stage for the separation of selenium from the waste water as described above, a concentration of <15 μg of selenium per liter of waste water can be achieved.

Alternatively, or in addition to the above-mentioned precipitation of selenium, a preferred embodiment of the invention provides that the selenium (or the remaining selenium after the first precipitation) is removed from the solution with a reduced mercury content by passing the solution through a strongly alkaline ion exchanger (containing for example dimethylamino ethanol functional groups), so that selenoxo ions become bound to the ion exchanger. Following this procedure for the removal of selenium, extremely low residual concentrations, i.e. <5 μg/L, in the treated waste water can be achieved.

In order to improve the flocculation of dissolved solids (for the removal of sulfate and selenium or selenium-containing substances), a flocculation/coagulation aid, preferably polyacrylamide, is added when precipitating barium sulfate and/or selenium and selenium-containing substances. Flocculation/coagulation aids accelerate the sedimentation or flotation of suspended solid particles so that the solids to be separated can be separated more easily and quickly when used in connection with technologies or devices known to people skilled in the art (such as centrifuges, decanters, belt filters or filter presses). In addition to the preferred polyacrylamide, other flocculation/coagulation aids such as polyacrylate, polyethyleneimine, polyethylene as well as natural products such as starch and glue can all be used in the same capacity.

As mentioned above, the precipitation of barium sulfate with excess stoichiometric quantities of $Ba^{2+}$ ions can be performed without incurring detrimental impacts on the subsequent two method stages for the precipitation of mercury and selenium as the increased barium concentration does not disrupt or inhibit these processes from occurring.

However, all water or acid soluble barium compounds are poisonous. A dose of 1 to 15 grams can be fatal for an adult depending on the solubility of each barium compound and therefore it is preferred that the waste water, after the separation of mercury and selenium, is, in a final method step, subjected to a sulfate-containing solution or solid to precipitate the remaining barium sulfate residues. Depending on the amount of precipitated barium sulfate at this stage, it can be separated from the treated waste water prior to discharge.

In the case of waste water from flue gas desulfurization plants the waste water contains large amounts of chloride ions due to the inherent exposure to flue gas. Due to the high chloride concentration, the waste water with reduced selenium content (from process step e) or from process step f)) cannot be recirculated to a system or to the system generating the waste water, for instance a flue gas desulfurization plant, since the chloride concentration would consistently and continuously increase, because of the lack of a chloride reducing process (no chloride abatement).

Therefore a preferred embodiment of the invention provides that the effluent generated by steps e) or f) is pumped through at least one reverse osmosis membrane system where a separation of waste water into a permeate with a reduced chloride content and a concentrate with an increased chloride content is carried out. The permeate with a reduced chloride content is returned to the plant from which the waste water in step a) originates. The concentrate is either further treated (i.e., by means of partial or total water evaporation) or, if permeable, released to the environment.

With the implementation of the proposed method, the need for fresh water for the waste water generating system (e.g., for cleaning or flushing of the ion-exchange system or other uses) is greatly reduced since a portion of the treated water is circulated back to the waste water generating system. Furthermore, the amount of water discharged to the environment decreases, making both factors significant contributors to a more cost-effective process management.

Removal of Mercury and Selenium with Adsorbent Agents

In an alternative or additional embodiment, one or more adsorbent agents either in combination or in sequence may be used to remove the mercury and selenium from the waste water. The adsorbent agents may be used in lieu of or in combination with ion-exchange.

A wide variety of adsorbent agents may be used in the practice of the present invention. The following Table I summarizes characteristics of adsorbent agents that may be suitable in embodiments of the invention.

TABLE I

Representative adsorbent agents

| Physical Property | Units | Activated Carbon | Hearth Coke | Mineral Based Sorbents | Zeolites (aluminum silicates) |
|---|---|---|---|---|---|
| Surface Area, BET | $m^2/g$ | 200-1300 | 270-330 | >40, >150 | >150-1000 |
| Grain Size (d50) | μm | 10-30 | 30-60 | 10-620 | 6 |
| Bulk Density | $g/cm^3$ | 0.25-0.8 | 0.55 | | 0.5-2.5 |
| Pore Volume | ml/g | | | | 0.05-0.35 |

Suitable adsorbent agents may include, for example, carbon, activated coke, hearth oven coke made from bituminous coal (hard coal) and/or lignite coal (brown coal), polyamide, cellulose, zeolites, aluminum silicates, amended silicates, clay minerals and limestone based adsorbent agents, and combinations thereof.

The following Table II characterizes some physical properties of preferred adsorbent agents that may be used in embodiments of the present invention.

TABLE II

Representative physical properties of preferred adsorbent agents

| Physical Property | Units | Activated Carbon: Norit GL50 | Activated Carbon: EcoSorb XF | Limestone based Sorbent: Sorbacal | Zeolithe: Minsorb DX | Zeolithe: Wessalith |
|---|---|---|---|---|---|---|
| Surface Area, BET | $m^2/g$ | 1050 | | 40 | >150 | 700 |
| Grain Size (d50) | μm | 20-23 | 4.6 | | | |
| Bulk Density | $g/cm^3$ | 0.45 | 0.25 | | | |
| Pore Volume | ml/g | | | 0.2 | | 0.29 |

EXAMPLES

Preferred embodiments of the invention are described in the following sections. FIG. 1 shows a schematic flow of the semi-continuous process.

1. First Preferred Embodiment (Semi-Continuous Process)

1.1 General Description

In a first embodiment of the method (see FIG. 1) a mercury- and selenium-contaminated waste water volume, V1, with a known sulfate concentration from a flue gas desulfurization plant is provided in a first reactor 1.

With a pump, denoted as P1, Ba and Ca hydroxide and a flocculant are introduced to the waste water, wherein the preferred way and precise amounts are clarified by the detailed description shown below. The term "flocculant" also referred to as "flocculent", is commonly known to include clarifying agents that may be used to remove suspended solids from liquids by inducing flocculation.

The resulting solids, comprising mainly barium sulfate and depending on the amount of precipitate added can also comprise barium selenate, and other solids, is separated and disposed of or further utilized depending on its purity.

The low-solid waste water from the above-mentioned sulfate precipitation stage is supplied via a pump, P2, to a mercury stage with an ion exchanger 1, which is capable of reducing the inherent mercury concentration to less than 12 ng/L resulting in a wastewater with a reduced mercury content.

The waste water with the reduced mercury content can be fed via a pump, P3, to a reactor 2—the selenium precipitation stage—for the separation of the selenium and selenium-containing solids. In reactor 2 the solution for precipitation of selenium-containing compounds is mixed with a iron mixture, Ca-hydroxide and a flocculant via pump P4 and mixed (to the exact details, see detailed description). After a predetermined reaction time, the resulting solids are separated, and the waste water demonstrates (depending on the exact reaction conditions) a mercury concentration of <12 ng/l and a selenium concentration of <15 µg/L. If the residual concentrations are in line with the inherent allowable limit values, the waste water can be discharged to the environment, or at least partially fed back into the cycle (for example, into the flue gas desulfurization plant).

If the residual selenium concentration requires additional reduction, the waste water may alternatively be fed by a pump, P5, to a selenium removal step utilizing a 2nd ion exchanger. The 2nd ion exchanger reduces the selenium concentration to <6 µg/L. The effluent of the 2nd ion exchanger can then either be discharged to the environment, or at least partly fed back into the cycle (for example, into the flue gas desulfurization plant).

The solution with reduced mercury content may alternatively, for example, when the selenium load is relatively small, be directly (without the "detour" step over the selenium precipitation stage for the precipitation of selenium) conveyed via pump P6 to the 2nd ion exchanger. The effluent from ion exchanger 2 can in this case either be discharged to the environment or, at least in part, recycled through the system (for example as in the flue gas desulfurization plant).

If the effluent to be discharged to the environment from ion exchanger 2 or reactor 2 of the selenium precipitation step is loaded with barium, as in the case where excess stoichiometric amounts of barium are used in order to precipitate barium sulfate, sulfate is to be added to the portion of the effluent of ion exchanger 2 or reactor 2 that is intended for discharging to the environment in order to precipitate the residual barium as barium sulfate, which can then be separated prior to discharge. The additional separation of barium in the effluent of ion exchanger 2 or reactor 2 is normally not explicitly necessary but can be done as described above.

If recycling at least a portion of the treated waste water back into the waste water generating system is desired, the treated waste water from the selenium removal step can be pumped (or at least part of this waste water) via pump, P7 or P8, to a reverse osmosis system in which the waste water is separated into a concentrate with increased chloride concentration and a permeate with a reduced chloride concentration, wherein the chloride concentration in the permeate is less than that of the contaminated waste waters provided in step a). The permeate is returned via pump P8 to the waste water generating system, where it is introduced into the process at a suitable point. The concentrate is further treated or discharged.

1.2 Description of Stages

The individual steps of the semi-continuous method are described in detail, notably based on a laboratory scale process, since this is how the results here were generated.

1.2.1. Sulfate Precipitation Stage

The waste water from a flue gas desulfurization plant with a known sulfate concentration which is contaminated with mercury and selenium is provided to reactor 1.

1.2.1.1 Rapid Addition of Precipitating Agent (Experiments No. 3-5)

A 10 wt % barium hydroxide solution (precipitating agent) in stoichiometric amounts is added to waste water volume, V1, without delay while stirring the resulting mixture. The pH of the resulting mixture increases to about 10.5-11.0. Following the addition of barium hydroxide a 20 wt % suspension of calcium hydroxide is added until the pH reaches 11.5 to 11.6. Meanwhile, an adapted amount of polyacrylamide is added as a flocculant in small amounts. The suspension is then stirred for 1 hour and the solid(s) is/are separated from solution. Waste water is pumped out and the solid(s) is/are discharged through a valve at the bottom of the reactor vessel and the solid is dewatered. At this point for test purposes, the sulfate content of the waste water was determined.

1.2.1.2 Slow Addition of Precipitating Agent (Experiments No. 6-11) (Best Embodiment of the Invention for Sulfate Precipitation)

A stoichiometric amount of 10 wt % barium hydroxide solution as the precipitating agent is slowly (and depending on the volume, V1, for example over a period of 5 to 8 minutes) added to waste water volume, V1, during which the pH of the waste water measures 10.5 to 11.0. Following the addition of the barium hydroxide solution, a 20 wt % suspension of calcium hydroxide is added, until a pH of 11.5-11.6 is reached. Meanwhile, an adapted amount of polyacrylamide is added as flocculant in small amounts. The mixture is then stirred for 1 hour (as in experiments 6-8) or 0.5 hr (as in experiments 9-11) and the solids are separated. For test purposes the sulfate content of the waste water was determined.

Process Parameters Experiments No. 6-11
Waste water
V=1 L, T=25° C., P=1 atm., pH=7.5-8.5,
Reaction time 60 min (Tests 6-8, 30 min Test 9-11)
Chemicals
    100 mL $Ba(OH)_2 \cdot 8H_2O$ (≥ 98% CAS 12230-71-6) 10%-wt. is slowly added (10 mL/min.). The pH rises to 10.5-11.0.
    $Ca(OH)_2$ (>95% ACS, CAS 1305-620) 20%-wt. suspension was added together with 1 mL of polyacrylamide (50% by weight aqueous solution, CAS 9003-05-8.) until a pH of 11.5 to 12.0 is reached As Table 1 shows, the content of sulfate with barium hydroxide as the precipitating agent can be reduced with rapid addition of the precipitant to about 35 mg/L (experiments 3-5).

This value is considerably higher than those sulfate concentrations achieved using precipitating agent combinations (as in experiments 1 and 2). The disadvantage of the use of precipitating agent combinations according to experiments 1 and 2 is that the precipitating agents used in addition to barium hydroxide are far more costly and implementation on a large scale is not economically feasible.

As experiments 6-11 clearly indicate, the remaining sulfate concentration can be surprisingly and significantly reduced if the same amount of precipitating agent barium hydroxide is not added quickly, but rather added over a longer period of time depending on the volume of waste water to be treated. The precipitation, however, proceeds despite slower addition of the precipitant without any measurable delay (see experiments 9-11.

TABLE 1

Residual sulfate concentration after barium sulfate precipitation.

| Experiment No. | Time (h) | Precipitating agent | Precipitating agent solution added (mL) | $SO_4^{2-}$ in waste water (mg/L) |
|---|---|---|---|---|
| 1 | 1 | $CaAl_2O_4$ (99%) + $Al_2O_3$ (98%) + $Ba(OH)_2$ (25 g + 100 g + 50 g) 17.5%-w/w. | 150 | <10 |
| 2 | 1 | $Al_2O_3$ (98%) + $Ba(OH)_2$ (100 g + 100 g) 20%-w/w. | 100 | <10 |
| 3 | 1 | $Ba(OH)_2$ (100 g @ 1 L deionized) | 100 | 35 |
| 4 | 1 | $Ba(OH)_2$ (100 g @ 1 L deionized) | 100 | 30 |
| 5 | 1 | $Ba(OH)_2$ (100 g @ 1 L deionized) | 100 | 35 |
| 6 | 1 | $Ba(OH)_2$ (100 g @ 1 L deionized) | 100 | <10 |
| 7 | 1 | $Ba(OH)_2$ (100 g @ 1 L deionized) | 100 | <10 |
| 8 | 1 | $Ba(OH)_2$ (100 g @ 1 L deionized) | 100 | <10 |
| 9 | 0.5 | $Ba(OH)_2$ (100 g @ 1 L deionized) | 100 | <10 |
| 10 | 0.5 | $Ba(OH)_2$ (100 g @ 1 L deionized) | 100 | <10 |
| 11 | 0.5 | $Ba(OH)_2$ (100 g @ 1 L deionized) | 100 | <10 |

1.2.2 Mercury Precipitation Stage

The waste water from the sulfate precipitation step is conducted to an ion exchange column (height 435 mm, diameter=90 mm) filled with 500 g of ion exchange resin Lewatit TP 214 thiocarbamide groups ($CH_4N_2S$). The waste water was fed into the column by means of a diaphragm pump. By cold vapor atomic fluorescence spectroscopy the mercury content of the solution leaving the column was determined (the detection limit of this method is 1 ng/L). The mercury concentration in the solution was 5.5 ng/L.

1.2.3 Selenium Precipitation Stage 1.2.3.1 Selenium Precipitation via Separation of Solids In the precipitation stage, selenium or selenium-containing compounds are separated. In order to gain optimal separation result, many laboratory tests were performed for the selenium precipitation step. The results of these tests are given in Table 2 as shown below. The details for the individual experiments or trials, particularly regarding the effects of changing various process parameters, are shown below.

A mixture of metallic powdered iron (≥99% purity), $FeCl_2 \cdot 4H_2O$ (≥99%) and $FeCl_3 \cdot 6H_2O$ (≥98%) ("iron mixture" in Table 2) in various proportions and amounts was added to the waste water with reduced mercury content leaving the mercury removal stage. Samples were taken every hour and a determination of selenium content according to DIN EN ISO 17294-2 (ICP-MS) was performed.

As Table 2 shows, the influence of the reaction time played a minor role (experiments 14-23) and the residual selenium concentration varied only slightly with varying reaction times of 1 to 3 or 4 hours.

The influence of pH, however, was surprisingly large; there were relatively large variations in the selenium concentration detected between pH 7-11.

The pH of the waste water with a reduced mercury content was about 6.5. After the addition of the particular iron mixture, the pH dropped to about 3-4 and a 20% suspension by weight of $Ca(OH)_2$ for the adjustment of the pH was added to the solution.

An increase of the pH to about 11 did not yield decreased residual selenium concentrations. It was determined that in nearly neutral to slightly alkaline environments (pH 7.4 to 8.0; experiments 18-23) the greatest selenium precipitation (residual concentration of selenium 15 micrograms/L) was achieved.

The ratio Fe/Fe (II)/Fe (III) of 1:10:10 (experiments 18-23) proved to be optimal. As a comparison of experiments 18-20 and 21-23 indicates, the addition of an increased mixture of iron results in no additional decrease in the residual concentration of selenium.

The experimental results shown in Table 2 only relate to iron mixtures with ferric chloride compounds since these compounds gave the best results for the precipitation of selenium.

Slow Addition of the Iron Mixture (Experiments 18-20) (Best Known Implementation of Selenium Process Step Per Separation)

To a waste water volume, V1, with a reduced mercury content (effluent from mercury stage) a 100 ml suspension of an iron mixture in water (see experiments 18-20) was added slowly (and depending on the volume, V1, for example, over a period of 5 minutes), to yield a pH of about 3.0-3.5. Subsequently, a 20 wt calcium hydroxide suspension was added until the pH measured 8. Simultaneously, an adapted amount of polyacrylamide was added as a flocculant. The suspension was then stirred for 3 hours and the solid was separated. After each hour a sample was drawn to determine the selenium content.

The waste water from the selenium solid separation can either be conducted to the selenium separation with ion exchangers or can be released to the environment.

Process Parameters:
Solution with reduced mercury content (from Hg stage)
V=1 L, T=25° C., p=1 atm, pH=6.0-. 7.0.
Reaction time: 60 min
Chemicals:
  100 mL (20 mL/min.) of an iron-containing solution [1] is added to 1 L solution from the mercury stage (pH after addition: 3.0-3.5)
  $Ca(OH)_2$ (>95% ACS, CAS 1305-620) 20-wt. suspension was added together with 1 mL of polyacrylamide (50% by weight. Aqueous solution, CAS 9003-05-8) until a pH of 7.5 to 8.0 is reached
  [1] add 1 g of Fe (99%, powder, CAS 7439-89-6), 10 g of $FeCl_2.4H_2O$ (≥99%, CAS 13478-10-9) and 10 g of $FeCl_3.6H_2O$ (≥99%, CAS 10025-77-1) in 500 mL of deionized water.

Table 3 shows experimental results of comparative experiments. The precipitation of selenium was investigated under varying parameters once with a known iron mixture (Experiments 1-3), comprising Fe (0) and Fe (II), and again based on the method of the invention where the iron mixture comprises Fe (0) and Fe (II) and Fe (III) (Experiments 4-6).

Surprisingly, the use of the iron mixtures based on the method of the invention proved to have a very significant and unexpected impact on selenium precipitation.

With regard to pH 8, at which the selenium precipitation was the largest for both test types, the iron mixture based on the invention results in a selenium precipitation increased by a factor of ten when using the preferred composition of the iron mixture and a reaction time of one hour. As Table 2 shows, the effect of selenium precipitation also occurs with other compositions of the iron mixture but not to the same extent, as is the case in the preferred iron mixture.

When using the iron mixture proposed by the invention, the selenium precipitation can thus be performed much faster and therefore is more cost-effective.

1.2.3.2 Selenium Removal via Ion Exchange

By utilizing the above mentioned method for the precipitation of selenium via solids separation, a residual selenium concentration of <15 µg/L can be achieved. If the stipulated limit values are lower, the above procedure is insufficient.

Alternatively (or in addition after the precipitation of selenium via solids separation), selenium can be removed with an ion exchanger. The feed for this process can either be the effluent of the mercury removal stage or, as described in the process above, the waste water produced by the selenium precipitation process by solid separation.

To obtain a selenium concentration in the treated solution of <6 µg/L, the ion exchange resin DOWEX Marathon A2 was used. According to the manufacturer, this resin is capable of removing anions from waste water with a high content of chloride ions, which is particularly advantageous if selenium has previously been separated by using iron compounds. The resin comprises dimethylethanol amine functional groups that are associated with ion exchange resins that are strongly alkaline.

Similar to the mercury removal stage, 0.5 L of DOWEX Marathon A2 was added to a 1.5 L column. The flow rate was measured to be 1 L/hr. Samples were taken from a reservoir at regular intervals and mixed. The composite sample was then sent to an analytical laboratory. The residual selenium concentration of the combined sample was <5 µg/L. Further details could not be established because the detection limit of the ICP-MS unit for selenium is 5 µg/L.

TABLE 2

Selenium removal with various iron mixtures

| Experiment No. | Time (h) | Iron mixture | Iron mixture added (mL) | $Ca(OH)_2$ 20%-w/w suspension added | Se in waste water(µg/L) |
| --- | --- | --- | --- | --- | --- |
| 12 | 2 | $Fe + FeCl_2 + FeCl_3$ (0.5 g + 5 g + 5 g @ 500 mL) | 51 (until a pH of 4 is reached) | Until a pH of 10.8 | 70 |
| 13 | 2 | $Fe + FeCl_2 + FeCl_3$ (0.5 g + 5 g + 5 g @ 500 mL) | 60 (until a pH of 4 is reached) | Until a pH of 6-7 | 53 |
| 14 | 1 | $Fe + FeCl_2 + FeCl_3$ (0.5 g + 5 g + 5 g @ 500 mL) | 50 (until a pH of 4 is reached) | Until a pH of 11 | 45 |
| 15 | 2 | $Fe + FeCl_2 + FeCl_3$ (0.5 g + 5 g + 5 g @ 500 mL) | 0 | 0 | 48 |
| 16 | 3 | $Fe + FeCl_2 + FeCl_3$ (0.5 g + 5 g + 5 g @ 500 mL) | 0 | 0 | 47 |
| 17 | 4 | $Fe + FeCl_2 + FeCl_3$ (0.5 g + 5 g + 5 g @ 500 mL) | 0 | 0 | 47 |
| 18 | 1 | $Fe + FeCl_2 + FeCl_3$ (1 g + 10 g + 10 g @ 500 mL) | 100 (until a pH of 3.3 is reached) | Until a pH of 8 | 15 |
| 19 | 2 | $Fe + FeCl_2 + FeCl_3$ (1 g + 10 g + 10 g @ 500 mL) | 0 | 0 | 15 |
| 20 | 3 | $Fe + FeCl_2 + FeCl_3$ (1 g + 10 g + 10 g @ 500 mL) | 0 | 0 | 17 |
| 21 | 1 | $Fe + FeCl_2 + FeCl_3$ (1 g + 10 g + 10 g @ 500 mL) | 150 (until a pH of 3.1 is reached) | Until a pH of 7.4 | 15 |
| 22 | 2 | $Fe + FeCl_2 + FeCl_3$ (1 g + 10 g + 10 g @ 500 mL) | 0 | 0 | 16 |

TABLE 2-continued

Selenium removal with various iron mixtures

| Experiment No. | Time (h) | Iron mixture | Iron mixture added (mL) | Ca(OH)$_2$ 20%-w/w suspension added | Se in waste water(μg/L) |
|---|---|---|---|---|---|
| 23 | 3 | Fe + FeCl$_2$ + FeCl$_3$ (1 g + 10 g + 10 g @ 500 mL) | 0 | 0 | 17 |
| 24 | 1 | Fe + FeCl$_2$ + FeCl$_3$ (1 g + 20 g + 25 g @ 500 mL) | 100 (until a pH of 2.7 is reached) | Until a pH of 8.0 | 36 |
| 25 | 2 | Fe + FeCl$_2$ + FeCl$_3$ (1 g + 20 g + 25 g @ 500 mL) | 20 (until a pH of 8.2 is reached) | 0 | 30 |
| 26 | 3 | Fe + FeCl$_2$ + FeCl$_3$ (1 g + 20 g + 25 g @ 500 mL) | 0 | 0 | 32 |

TABLE 3

Comparison of selenium removal treatments

| Experiment No. | Iron mixture | Adjusted pH | Se before removal (μg/L) | Se after removal (μg/L) | % Removed |
|---|---|---|---|---|---|
| 1 | Fe (0) + FeCl$_2$ (1:10) | 6.0 | 380 | 330 | 13.16 |
| 2 | Fe (0) + FeCl$_2$ (1:10) | 7.0 | 270 | 220 | 18.52 |
| 3 | Fe (0) + FeCl$_2$ (1:10) | 8.0 | 323 | 184 | 43.03 |
| 4 | Fe (0) + FeCl$_2$ + FeCl$_3$ (1:10:10) | 6.0 | 323 | 95.4 | 70.46 |
| 5 | Fe (0) + FeCl$_2$ + FeCl$_3$ (1:10:10) | 7.0 | 323 | 104 | 67.80 |
| 6 | Fe (0) + FeCl$_2$ + FeCl$_3$ (1:10:10) | 8.0 | 331 | 14.5 | 95.62 |

2. Continuous Process Systemization

In a second preferred embodiment of the invention (see FIG. 1), a sulfate-containing waste water contaminated with mercury and selenium and having a known sulfate concentration is provided in a flow reactor.

The individual method steps correspond with those stipulated by the semi-continuous method, but instead of working in separate reactors, the process is modified to be more in line with a continuous flow reactor, in which case the method steps occur at different locations along the "process line".

In view of the fact that the individual method steps are the same, and only vary in terms of the technical differences between a semi-continuous versus a continuous system, a more detailed description of the method will be omitted, based on the idea that a continuous flow reactor is widely familiar to industry professionals. Moreover, the necessary process techniques to conduct the individual steps of the various processes are generally understood in the industry and are considered standard methods.

In further embodiments, the above described processes may also include one or more additional steps comprising a high pressure separation device. High separation devices may include reverse osmosis, nanofiltration, ultrafiltration, and microfiltration. The arrangement and position of the step of using a high separation device may be varied relative to the other steps (e.g., sulfate removal, mercury removal, and selenium removal). For example, the step of the high separation device may be positioned prior to sulfate removal or after sulfate removal, such as at the end of the process. In a preferred embodiment, a high separation device may be positioned following the step of sulfate removal.

In addition, to the above described processes for removing mercury and selenium from sulfate containing-waste water, the embodiments described below describe processes of using high separation devices for the removal of various contaminants from a wastewater stream. The embodiments described below may be used independently or in combination with the foregoing discussed embodiments.

According to a further embodiment of the invention, a method for treating waste water is provided, having the steps of (a) providing a waste water of the flue gas desulfurization plant having a specific sulfate, chloride, mercury and selenium concentration, (b) feeding the waste water through a high-pressure pump) to a high pressure separator in which the waste water is separated into a permeate volume containing reduced sulfate, chloride, mercury and selenium concentrations, and a concentrate volume, (c) feeding the concentrate volume to a cleaning apparatus in which the mercury and the selenium concentration of the concentrate volume is reduced.

According to the present invention for the treatment of waste water generated by a flue gas desulfurization plant, a waste water generated by the flue gas desulfurization plant containing sulfate, chloride, mercury and selenium is provided. This waste water is fed via a high pressure pump into a high pressure separator where the waste water is separated into a permeate volume with a reduced sulfate, chloride, mercury and selenium concentration and a concentrate volume. The concentrate volume is supplied to a cleaning apparatus, where the mercury and selenium concentration of the concentrate volume is reduced. Potentially the concentration of other pollutants contained in the concentrate volume can be reduced as well.

Although high-pressure separators have long been used, it was surprisingly found that they are suitable for the separation of mercury and selenium compounds from waste water of a flue gas desulfurization plant, i.e. the separation of mercury and selenium with an appropriate separation device, even in spite of the significant sulfate concentration of the waste water, is possible. This is particularly surprising since it is well known that sulfates interfere in the separation of mercury and selenium, and the sulfate concentration in the waste water of flue gas desulfurization plants is usually well within the range of the solubility limit.

When passing the waste water through the high pressure separator a permeate volume with a reduced sulfate, chloride, mercury and selenium concentration and a concentrate volume that shows as a minimum an increase in the selenium concentration is obtained and only the concentrate volume is fed to the cleaning apparatus since the concentrations of pollutants in the permeate volume are so small that the water can be discharged to the environment and/or re-used in the process.

Since the sulfate concentration of the waste water is usually in the range of the solubility limit, no increase in sulfate concentration is to be observed. It is to be assumed that sulfate is deposited within the separator when separating the permeate volume and the concentrate volume. In some cases even a decrease of the sulfate concentration in the concentrate is observed.

The same applies to mercury deposition. Although the mercury concentration in the permeate volume is significantly lowered, the concentrate volume itself does not see a corresponding increase in mercury concentration (and it is likely to be lower than in the waste water), so that in terms of mercury, it can be assumed that it (at least partially) settles in the high-pressure separator.

Typically, high pressure separating devices are operated in a $\geq 50 : \leq 50$ ratio, i.e. the waste water is split into $\geq 50\%$ vol. permeate volume and $\leq 50\%$ vol. concentrate volume. At a constant flue gas flow and employing a constant flue gas desulfurization cleaning process, in accordance with an embodiment of the invention, only $\leq 50\%$ of the usual waste water is fed to the cleaning apparatus which results in a significantly reduced cleaning device and operating costs.

In a specific embodiment of the invention at least one reverse osmosis device with at least one reverse osmosis module is used as the high-pressure separator. The handling of reverse osmosis devices has long been known, so the use of such devices is particularly simple. The high pressure separator comprises at least the reverse osmosis device which in turn comprises at least one reverse osmosis module in which the waste water is separated into a permeate volume with a reduced sulfate, chloride, mercury and selenium concentrations and a concentrate volume. Depending on the size of the cleaning device and thus on the amount of waste water, a combination of reverse osmosis modules can be used, which are then preferably connected in parallel, preferably having the ability to place each individual unit in and out of service depending on the amount of waste water.

It has surprisingly been found that separation of the waste water into a permeate volume with a reduced sulfate, chloride, mercury and selenium concentration as well as a concentrate volume can be achieved by employing a nanofiltration device. In an alternative embodiment of the invention a nanofiltration device with at least one nanofiltration module is used as the high pressure separator, wherein the high pressure separator can comprise additional components.

The stipulations on residual concentration of mercury and/or selenium in waste water released to the environment vary depending on the country, and experience has shown that these requirements are constantly increasing with time. To achieve further reduction of the mercury and selenium concentration in the permeate volume, a separator comprising a nanofiltration device and a reverse osmosis device are a preferred embodiment of the invention. Here the waste water is separated into a nano-permeate volume and a nano-concentrate volume. The nano-permeate volume is fed to the reverse osmosis device and is separated into a permeate volume and a concentrate volume. Finally, the nano-concentrate volume and concentrate volume of the reverse osmosis device are fed into the cleaning apparatus, in which the concentration of mercury and selenium in the concentrate volume is reduced.

This specific embodiment of the invention will result in an increased volume of waste water leaving the high pressure separator that is fed to the cleaning apparatus, meaning the amount of waste water which is to be fed to the cleaning apparatus for treatment is greater as compared to the employment of a standalone reverse osmosis device. However, the concentration of mercury and selenium in the permeate volume which leaves the high pressure separator is further reduced so that more stringent requirements for residual concentrations of mercury and selenium in the water to be discharged can be met.

When using a reverse osmosis and/or nanofiltration device for separating the waste into a low-pollutant concentration permeate and a concentrate volume, it is sometimes necessary, during operation, to clean or flush the membranes of the reverse osmosis module(s) or the nanofiltration module(s) itself, since solids can settle out during operation. In this process, water is added if necessary, with suitable additives, and flushed through the membranes and the module to dissolve solids and to remove them from the membranes and to wash out the membranes.

In order not to interrupt the process, a specific embodiment of the present invention describes that in the reverse osmosis and/or nanofiltration device several parallel lines be provided, each having at least one reverse osmosis or nanofiltration module, so that the lines can be switched on or off individually.

If, during this process flow, cleaning of the membrane(s) of the reverse osmoses module(s) or the nanofiltration module(s) itself located in a first line is necessary, this first line can be taken out of service, a second line can be switched on and the first line can be cleaned.

Depending on the length of time it takes to complete a cleaning process, it can be useful to provide not only two, but three or more parallel lines, since this ensures that the maximum purification capacity of the separator is used by operating as many modules and parallel lines simultaneously.

The reverse osmosis or nanofiltration modules, or a line with at least one module, can be taken out of service time dependent and rinsed or cleaned. A specific embodiment of the invention allows for that a reverse osmosis or nanofiltration module or a line with at least one reverse osmosis module to be automatically purged or cleaned as a function of predetermined parameters, so that a purging/cleaning is carried out only when necessary given the predetermined parameters of the system.

For purging and cleaning, respectively, of the module(s) or the membranes of the reverse osmosis, it is necessary to use water with reduced sulfate, chloride, mercury and selenium concentrations compared to the waste water that is to be separated and cleaned.

In a specific embodiment of the invention at least a part of the reserve osmosis permeate volume and/or nano-permeate volume having a reduced sulfate, chloride, mercury and selenium concentration as compared to the waste water are cached. The reverse osmosis module and nanofiltration module respectively or line of at least one module is rinsed with cached permeate volume. Thus, the fresh water consumption for flushing or cleaning of the separation device is reduced or it can even be avoided completely, if enough permeate is cached in the system.

Generally, flue gas desulfurization waste water is not regularly loaded with solids, as these (particular gypsum) are separated before leaving the flue gas desulfurization plant. It may happen that due to decreased or increased throughput of the flue gas desulfurization pant, minor amounts of solids are discharged with the waste water. In order to prevent these solids from depositing in the high pressure separator, a preferred embodiment of the invention provides that solids will be removed from the waste water before the waste water is separated into a permeate volume and a concentrate volume.

Even though the waste water is completely free of solids, solids will form on the membranes of the reverse osmosis module or in the nanofiltration module with time. In order to prevent the formation of solids, or at least slow down the process, a preferred embodiment of the invention describes the addition of antiscaling agents and/or an acid to the waste water prior to separation into a permeate volume and a concentrate volume.

During operation of a pilot plant analysis of the membranes in the reverse osmosis module or nanofiltration module respectively have indicated that in particular sulfate and, surprisingly, iron compounds are deposited in or on the membranes or modules, thus making flushing or cleaning necessary. To prevent such sticking of sulfates and iron compounds, it is a preferred embodiment of the invention to remove sulfates and/or iron compounds from the waste water before it is separated into a permeate volume and a concentrate volume.

Whether a nanofiltration device, or a reverse osmosis device is used as a high-pressure separator the sulfate, chloride, mercury and selenium concentration of the permeate volume and/or nano-permeate volume is reduced compared to the waste water generated by the flue gas desulfurization system. Therefore, it is a preferred embodiment of the current invention to return the permeate volume and/or nano-permeate volume to the flue gas desulfurization plant for reuse. Alternatively, the permeate volume and/or the nano-permeate volume may be used in other sections of the process or other process components. A corresponding process control has the advantage that the flue gas desulfurization plant, or any other portion in the process procedure, can be operated with reduced quantities of fresh water which provides for a more economical process. Alternatively or in addition, at least a portion of the waste water leaving the cleaning apparatus can be fed to the flue gas desulfurization plant or any other process component and reused.

In the cleaning apparatus, the concentration of mercury and selenium in the concentrate volume is reduced. This can be carried out using any desired method known to a person skilled in the art. In a preferred embodiment of the invention it is, however, provided that the mercury and selenium concentration of the concentrate volume is reduced in the cleaning device by precipitating $BaSO_4$ from the supplied concentrate volume by adding a defined amount of $Ba^{2+}$-ions to the concentrate volume and removing the resulting $BaSO_4$. The resulting low-solids concentrate volume is fed to an ion exchanger for the removal of mercury, wherein a concentrate volume with a reduced mercury content is obtained, and selenium and/or selenium compounds are removed from the concentrate volume.

Through the above steps, mercury and selenium can be removed from the concentrate volume economically and with simple plant design. The inventive sequence of the process steps is effective for the removal of mercury and selenium in sulfate loaded waste water without high investment costs or process complexity while adhering to very strict environmental limits.

The sulfate concentration of the concentrate volume is substantially reduced by precipitation, i.e. as barium sulfate, in a first process stage (Sulfate Precipitation Stage) which provides for a sulfate reduced waste water which now allows for subsequent removal of mercury (Mercury Stage) and selenium (Selenium Stage). When using a reverse osmosis device with a nanofiltration device upstream (see above), the sulfate precipitation stage for the reverse osmosis concentrate volume can be omitted since the sulfate concentration was already sufficiently lowered in the nanofiltration so that the remaining sulfate (also in the concentrate volume of the reverse osmosis system) does not interfere with the subsequent removal of mercury and selenium.

The process of precipitating barium sulfate is discussed above. In particular, based on a known sulfate concentration, a defined amount of $Ba^{2+}$ ions are added so that $BaSO_4$ precipitates from the solution. If the sulfate concentration is not known or varies widely, it may be determined before the sulfate precipitation. Other sulfate precipitation methods (e.g., with calcium aluminate) are also know and possibly suitable.

Especially when processing large amounts of waste water, it is desirable to carry out the precipitation and separation of the different solids quickly.

Surprisingly, it was found that the precipitation of selenium and selenium-containing solids takes place particularly rapidly when an iron mixture comprising Fe (0), Fe (II) and Fe (III) compounds is added, wherein it is preferred that Fe (III) is added in a powdered form. The mixing ratio of Fe (0), Fe (II) and Fe (III) will depend on the particular concentration of selenium in the waste water.

With the process stage for separation of selenium from the waste water as described above, a concentration of selenium <15 µg per liter of waste water can be achieved.

The invention further relates to the use of a reverse osmosis device, or a nano-filtration device for separation of a waste water into a permeate volume with reduced sulfate, mercury and selenium concentrations and a concentrate volume having increased sulfate, mercury and selenium concentrations.

Figure 2:
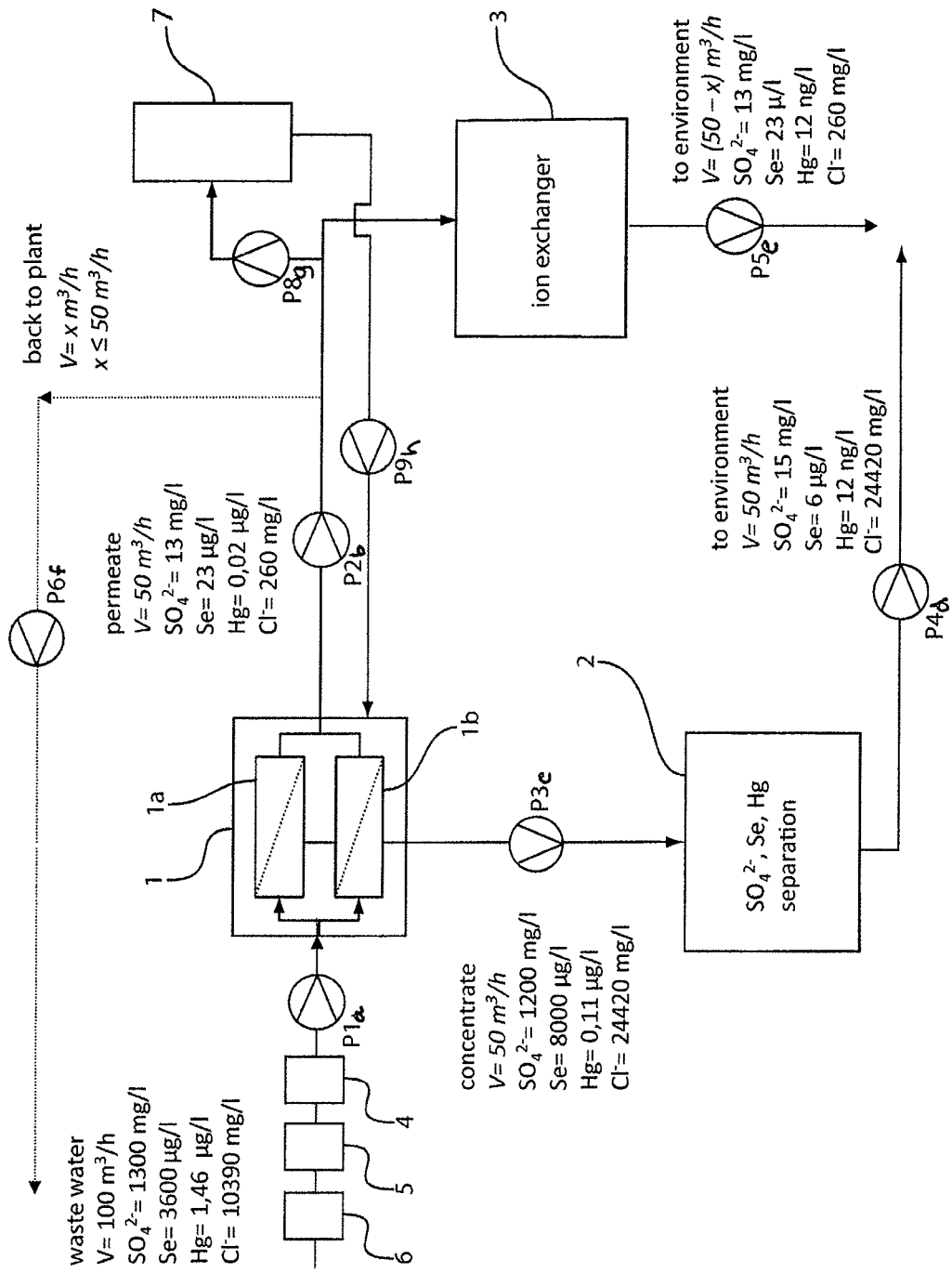
FIG. 2 depicts a further embodiment of the invention.

FIG. 2 shows a preferred embodiment of the invention. In this embodiment of the invention, a reverse osmosis device is part of a high-pressure separator 1. The reverse osmosis device comprises two parallel lines each having a reverse osmosis module 1a, 1b, wherein the individual lines may be switched on or off. The high pressure separator 1 is provided via a high-pressure pump P1a with a waste water WW, wherein in the case of the presented embodiment a waste water at 100 m³/h is provided. The waste water is generated by a flue gas desulfurization plant and contains (for the description of this embodiment) 1300 mg/L sulfate, 3600 µg/L selenium, 1.46 µg/L mercury and 10390 mg/L chloride (see Table 3).

TABLE 3

Substance concentrations in the waste water, permeate(s), concentrate(s)

| | Sulfate (mg/L) | Selenium (µg/L) | Mercury (µg/L) | Chloride (mg/L) |
|---|---|---|---|---|
| High pressure separator with reverse osmosis device | | | | |
| Waste water | 1300 | 3600 | 1.46 | 10390 |
| Concentrate | 1200 | 8000 | 0.11 | 24420 |
| Permeate | 13 | 23 | 0.02 | 260 |
| High pressure separator with nanofiltration device | | | | |
| Waste water | 1400 | 4000 | 1.44 | 10150 |
| Concentrate | 1400 | 7900 | 0.10 | 18100 |
| Permeate | 20 | 35 | 0.02 | 3930 |

TABLE 3-continued

Substance concentrations in the waste water, permeate(s), concentrate(s)

| | Sulfate (mg/L) | Selenium (µg/L) | Mercury (µg/L) | Chloride (mg/L) |
|---|---|---|---|---|
| High pressure separator with nanofiltration and reverse osmosis devices | | | | |
| Waste water | 1400 | 4000 | 1.44 | 10150 |
| Nano-concentrate | 1400 | 7900 | 0.10 | 18100 |
| Nano-permeate (Feed reverse osmosis) | 20 | 35 | 0.02 | 3930 |
| Osmosis concentrate | 40 | 68 | 0.04 | 7800 |
| Osmosis permeate | 1 | 1 | 0.005 | 150 |

After leaving the flue gas desulfurization plant, the waste water is passed through a device 6 for the separation of solids which may have been carried over by the waste water leaving the flue gas desulfurization plant. Typically, the waste water WW leaving the flue gas desulfurization plant is largely free of solids, so that the device 6 to remove solids is only optional and best used when the suspended solids are increased.

After the device 6 for the reduction of solids, the waste water is treated further in device 5 with an antiscaling agent and/or an acid in order to avoid or slow down the deposition of solids on the membranes of the reverse osmosis modules. Whether an antiscaling agent and/or an acid is added depends on the exact composition of the waste water and is therefore not absolutely necessary. Finally, sulfate and/or iron compounds are separated from the waste water in a device 4, since it has been shown that sulfates and iron compounds are preferentially deposited on the membranes of the reverse osmosis modules. Whether sulfate and/or iron compounds are separated depends on the exact composition of the waste water. The aforementioned devices 6-4 can be arranged in any order, and can even be combined into a single device.

The waste water is passed through the high pressure separator 1 with two parallel lines each having one reverse osmosis module. These reverse osmosis modules are adjusted so that the fed waste water is separated into a permeate volume PV of at least 50% and a concentrate volume CV of no more than 50%. The two parallel lines can operate at the same time. Depending on various other parameters only one line can be in operation and the other shut down for cleaning purposes such that the entire waste water is separated by one line. The number of lines used depends on the waste water itself as well as the frequency of the need for purification of the individual reverse osmosis modules, i.e. if frequent cleaning of the reverse osmosis modules is required due to the composition of the waste water, it may be appropriate to use a large number of parallel-connected lines.

In the high pressure separator 1, the waste water supplied via high pressure pump P1a is separated into a permeate volume PV and a concentrate volume CV. In the permeate volume PV, the sulfate concentration is 13 mg/L, the selenium concentration 23 µg/L, the mercury concentration 0.02 µg/L and the chloride concentration is 260 mg/L. In all of the aforementioned compounds, a significant reduction in the concentration as compared to the waste water WW is observed (Table 3).

Also in the concentrate volume CV a reduction of the sulfate concentration to 1200 m/L is observed, which is probably due to the fact that a part of the sulfate has settled on the membranes of the reverse osmosis modules. The selenium concentration almost doubled to 8000 µg/L, which is consistent with the significant reduction in the permeate volume and a separation efficiency of 50%. The mercury concentration in the concentrate volume is reduced to 0.11 µg/L, wherein it is assumed that also a part of the mercury compounds have also been deposited on the membranes of the reverse osmosis modules. The concentration of chloride in the concentrate volume is 24420 mg/L and is thus to some extent also twice as high as in the waste water.

The concentration of selenium and mercury in the permeate volume may now be already so low already that the permeate can be discharged (depending on the country-specific requirements) to the environment without further purification. If the discharge limit with regards to the concentration of mercury is still exceeded, the permeate may be fed to an ion exchanger by means of pump P2b in which the mercury concentration is significantly reduced again, resulting in a concentration of 12 ng/1. The purified permeate can then be discharged to the environment, over pump P5e, without any further purification.

Since sulfate, chloride, selenium and mercury are in low concentrations in the permeate as compared to the waste water, the treated water or a portion of it can be fed back into the desulfurization process or to an upstream process and be re-introduced into the process, which will considerably save on the amount of freshwater otherwise consumed by the process. Because of the aforementioned substantial reduction in pollutants inherent to the permeate, at least partial recirculation of the permeate will not result in elevated concentration of pollutants.

The presented embodiment of the invention also allows the supply of a part of the permeate volume to tank 7 over pump P8g. When cleaning the reverse osmosis modules is necessary, the permeate cached in the temporary storage can be fed to the high pressure separator via pump P9h and purge the membranes.

The concentrate volume CV is fed by pump P3e to device 2 for the deposition of sulfate, selenium, and mercury. The deposition of the above compounds can be carried out by using various methods known to the person skilled in the art.

A particularly efficient removal of sulfate, mercury and selenium from the waste water is described in detail in the sections below with respect to FIG. 5.

Separating Sulfate, Selenium, and Mercury

Figure 5:
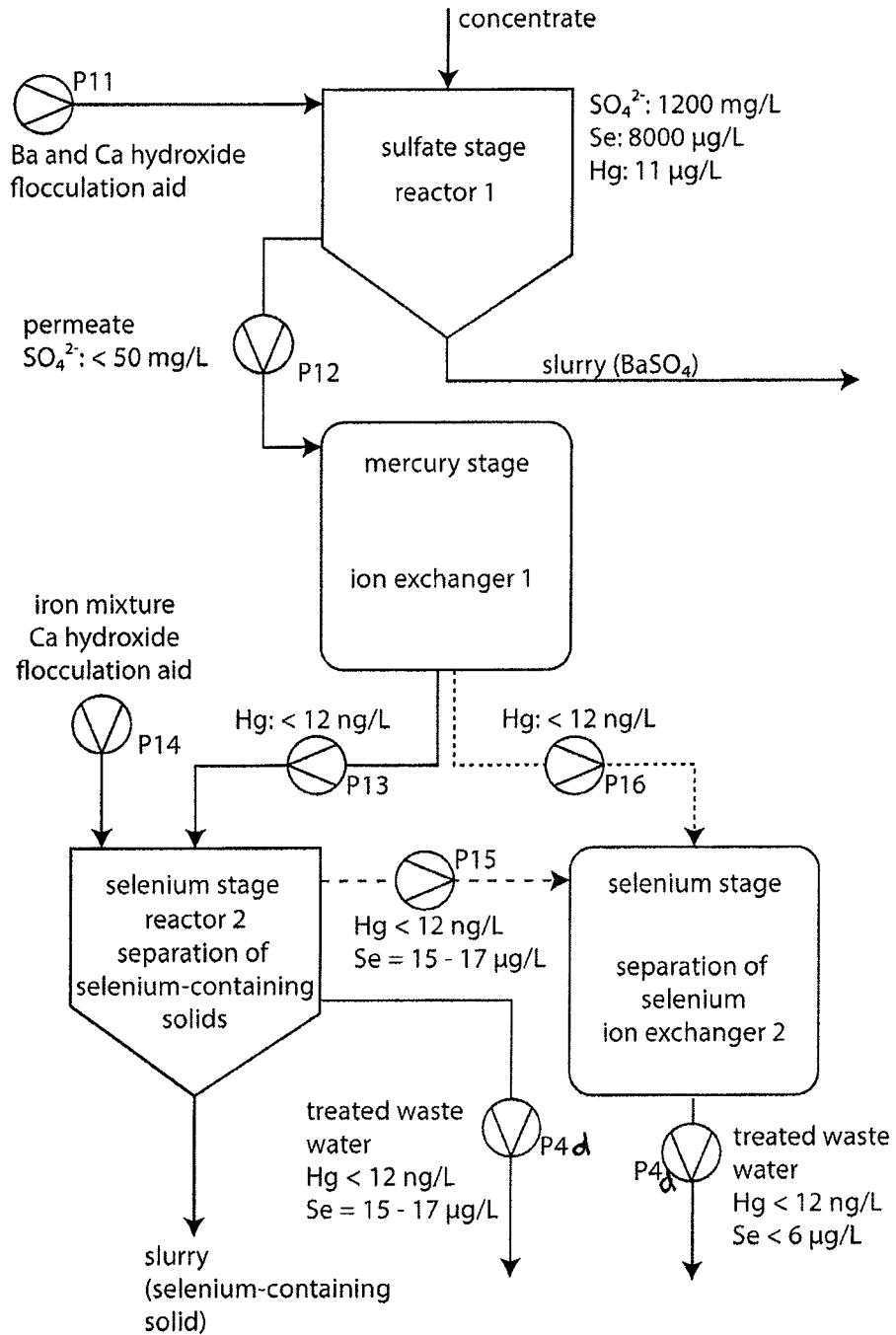
FIG. 5 depicts the removal of sulfate, mercury and selenium from a concentrate volume in detail.

Turning now to FIG. 5, with pump P11, Ba- and Ca-hydroxide and a flocculation aid are added to the concentrate volume. The resulting solid, which comprises mainly barium sulfate, but, depending on the amount of precipitant added to the solution, may also contain barium selenate and other solids, is separated and recycled or disposed of depending on the solid's purity.

The sulfate-poor concentrate volume is supplied by pump P12 to a mercury stage with an ion exchanger 1 in which mercury is removed to a concentration of <12 ng/L, resulting in a concentrate volume with decreased mercury content. The ion exchanger employs normal resins used for the removal of mercury from water.

The volume of reduced mercury concentrate can be fed by pump P13 to reactor 2 to the selenium stage for the separation of selenium and other selenium-containing solids. In reactor 2, a mixture of iron, calcium hydroxide and a flocculation aid (the exact details are shown below) are supplied over pump P14 to the concentrate volume under constant mixing. After a predetermined reaction time, the resulting solids are removed from the concentrate volume.

The concentrate volume has (depending on the exact reaction condition) a mercury concentration of <12 ng/L and a selenium concentration of about 15 μg/L.

If the residual concentrate concentrations meet local discharge limits, the volume may be discharged into the environment by means of a pump P4d (as shown in FIG. 2).

If the concentrate requires further reduction of the residual selenium concentration, the concentrate volume may alternatively be fed via pump P15 to an ion exchanger 2. In the ion exchanger 2 selenium is reduced to a residual concentration of <6 μg/L. The effluent of ion exchanger 2 may then be released to the environment.

The concentrate volume with the decreased mercury content may be fed, alternatively, if for example the selenium concentration is relatively small, directly (and without detour over the selenium separation for precipitation of selenium-rich compounds) by way of pump P16 to the ion exchanger 2. The discharge of ion exchanger 2 may also in this case be released to the environment.

If the effluent of ion exchanger 2 or reactor 2 of the selenium precipitation stage is still heavily burdened with barium, because for example, if an excess-stoichiometric quantity of precipitants was added in the sulfate precipitation stage, the discharge of ion exchanger 2 or of reactor 2, which is to be released to the environment, may be retreated with sulfate, in order to precipitate residual concentrations of barium as barium sulfate. Barium sulfate is, depending on its quantity, separated prior to removal/discharge. If the discharge of ion exchanger 2 or reactor 2 is recycled, the separation of barium may not be necessary; however, it may take place as indicated above.

Selenium deposition is described above in detail.

Figure 3:
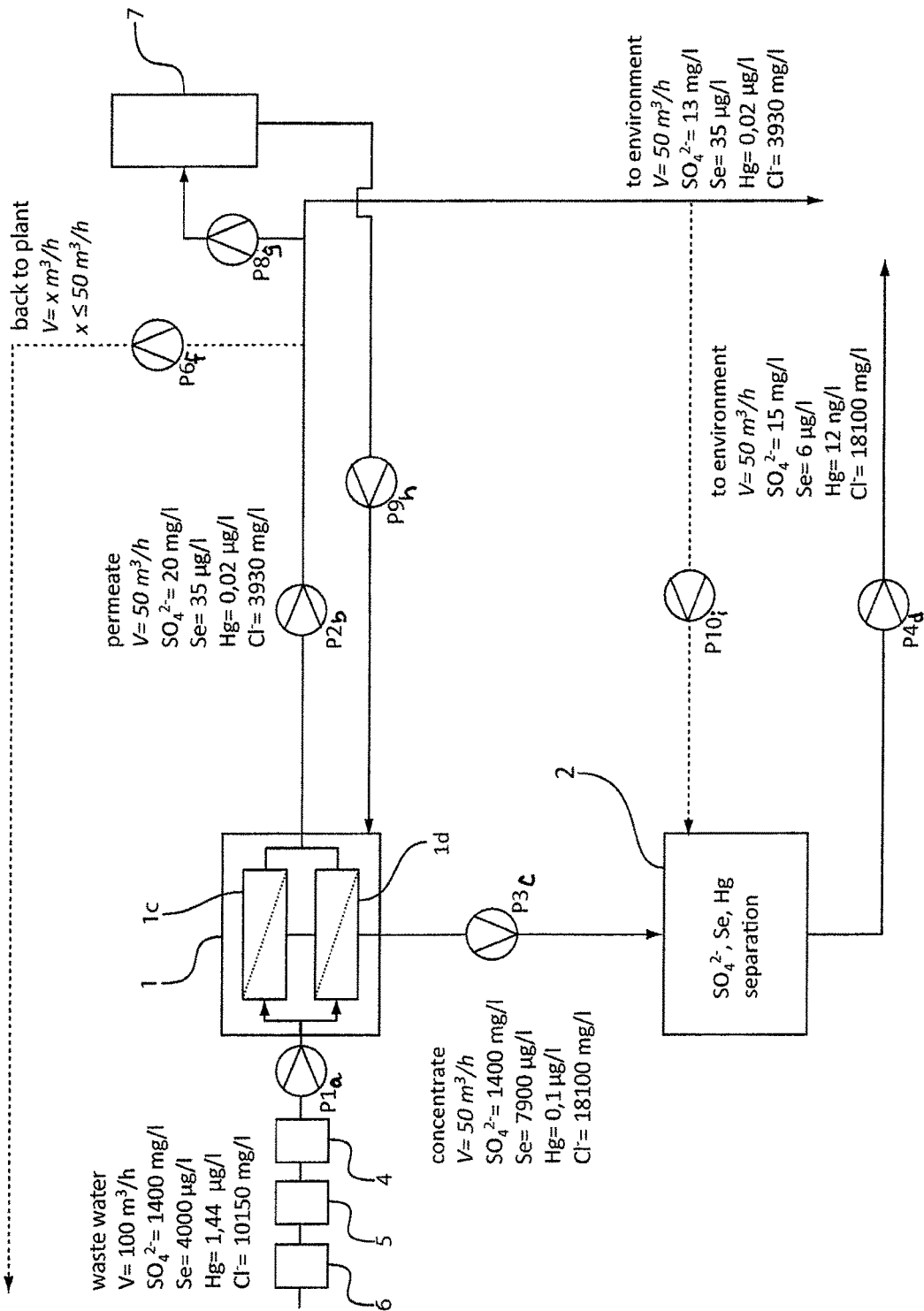
FIG. 3 depicts an embodiment of the invention.

FIG. 3 shows a second preferred embodiment of the present invention. In this embodiment a nanofiltration device is introduced as part of high pressure separator 1, wherein the nanofiltration device comprises two parallel operated nanofiltration modules 1c, 1d.

The information regarding the concentrations of sulfate, chloride, mercury and selenium in the waste water, in the permeate volume as well as in the concentrate volume, is shown in Table 3. This data proves that even when using a nano-filtration device, the permeate volume PV leaving the high pressure separator exhibits substantially decreased concentrations of the aforementioned compounds. The actual procedure essentially corresponds to that shown in FIG. 2 but with the specific embodiment of the present invention a subsequent purification of the permeate volume using an ion exchange system can be forgone. Further cleaning of the permeate volume can be forgone only if mercury and/or selenium concentrations are under the country-specific discharge limit; if this is not the case, an additional cleaning must take place, in which, as described in FIG. 2, the ion-exchange procedure (for mercury) is carried out or any other method known to a person skilled in the art.

Alternatively, the permeate may be fed to an apparatus 2, for example, by a pump P10i, in which the sulfate precipitation can be bypassed because the concentration of the sulfate is already low enough in the permeate. In order to avoid unnecessary repetition a detailed described of the second preferred embodiment of the invention is not further reiterated here.

Figure 4:
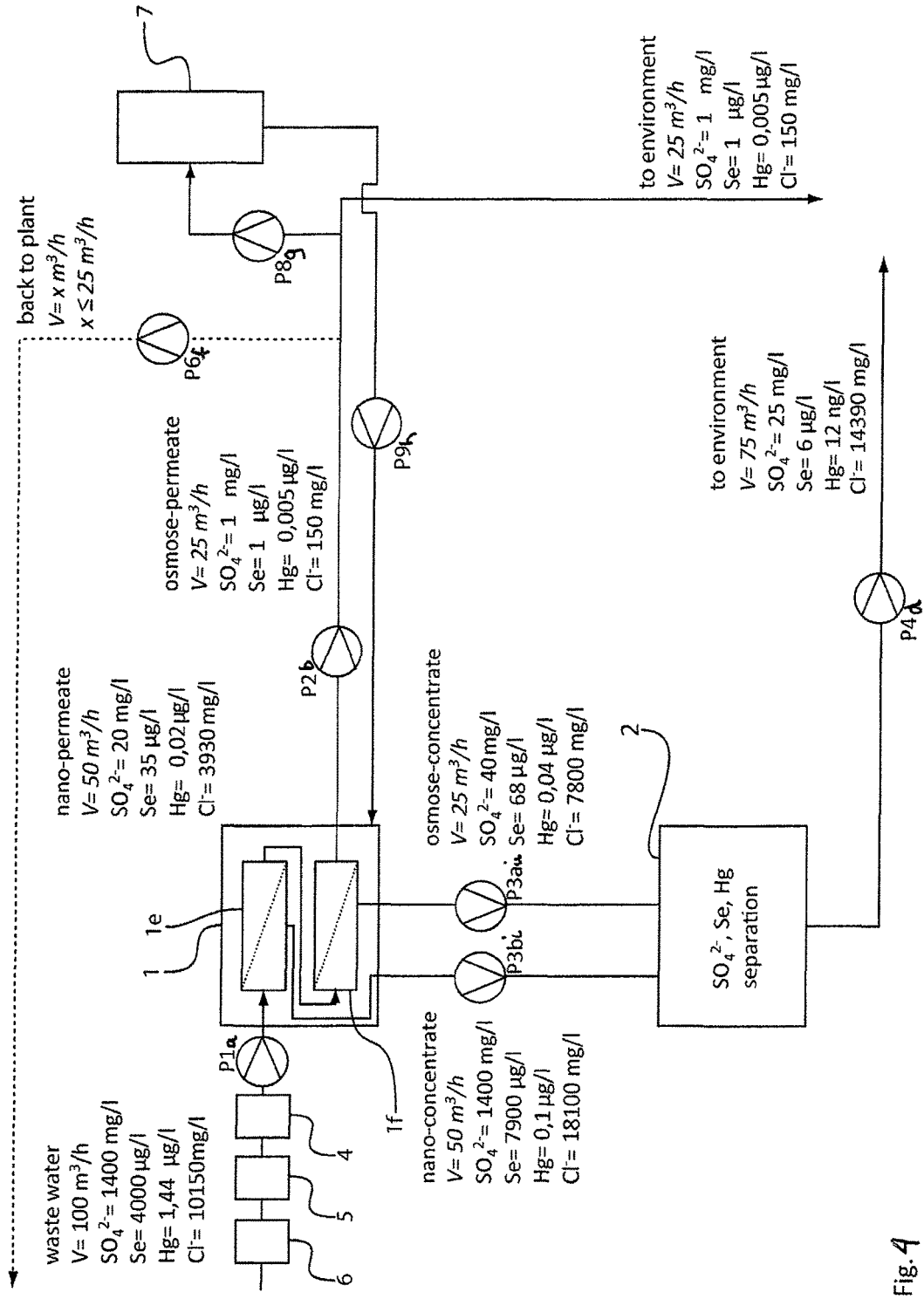
FIG. 4 depicts an embodiment of the invention.

FIG. 4 illustrates a third preferred embodiment of the present invention. In this embodiment the high pressure separating apparatus 1 comprised of a nanofiltration device 1e and a reverse osmosis device 1f. Reference is made to Table 3 with regard to the concentrations of sulfate, chloride, mercury and selenium in the waste water, in the permeates and in the concentrates.

The waste water WW containing sulfate, chloride, mercury and selenium is shown in FIG. 4 and is supplied via a high pressure pump P1a to the high pressure separator, more specifically to the nano-filtration device 1e of the high pressure separator 1. The nano-filtration device 1e of the high-pressure separator 1 may comprise several parallel (not shown in FIG. 4) nanofiltration modules that can be switched on or off separately if needed. The nanofiltration device 1e splits the waste water into a nano-permeate volume and the nano-concentrate volume at a ratio of ≥50/≤50%. The nano-concentrate volume is supplied through a pump P3bi to a device 2 for the separation of sulfate, selenium and mercury.

The nano-permeate with a reduced sulfate, chloride, mercury and selenium concentration is supplied as feed to the reverse osmosis device 1f, which separates the nanofiltration concentrate into a concentrate volume and a permeate volume, in which the reverse osmosis device 1f operates with a separation ratio of ≥50/≤50%. The concentrate volume of the reverse osmosis device 1f is supplied via a pump P3aii to the device for the separation of sulfate, chloride, mercury and selenium. Due to the fact that the nanofiltration device 1e is already upstream of the reverse osmosis device 1f, and contributed to a greatly reduced sulfate concentrate, the sulfate separation in device 2 can be circumvented. The combined concentrates cleaned by device 2 are fed by a pump P4d to the environment.

The permeate volume of the reverse osmosis device 1f can be supplied by a pump P2b to the environment. Alternatively, the permeate volume can be returned completely or partly to the flue gas desulfurization system or to another upstream system or temporarily stored in tank 7, from which it can be fed via a high pressure pump P8g to the high pressure separator 1 for cleaning purposes as required.

Although with this method, the effluent to be purified is mitigated by only ≥25% (at a separation efficiency of ≥50% for the nanofiltration and reverse osmosis device), the levels of selenium and mercury in the (reverse osmosis) permeate leaving the high pressure separator are lower compared to those of the permeates from the first and second preferred embodiments of the present invention. This way more stringent discharge limits can be met if necessary, without any further elaborate and costly purification processes.

Alternatively, to achieve an improved cleaning effect, a plurality of reverse osmosis devices and nanofiltration devices may be connected in series in the high-pressure separator. Often, however, a "mixture" of a reverse osmosis and nanofiltration device is preferred because it can specifically target certain pollutants for separation.

Which preferred embodiment of the present invention is best depends on the contamination of the waste water.

As noted previously, various adsorbent agents may be used in one or more embodiments of the present invention.

That which is claimed:

1. A method for removing mercury and selenium from sulfate-containing waste water generated in or by flue gas desulfurization plants, wherein the method comprises the steps of:
   a) providing a mercury- and selenium-contaminated waste water with a sulfate concentration,
   a1) measuring the sulfate concentration in the mercury- and selenium-contaminated waste water,
   b) adding a defined amount of $Ba^{2+}$ ions to the mercury- and selenium-contaminated waste water to precipitate BaSO$_4$ from the mercury- and selenium-contaminated waste water, said defined amount of Ba$^{2+}$ ions comprising an amount that is stoichiometric or slightly in excess of stoichiometric, b1) following the step of adding a defined amount of Ba$^{2+}$ ions, adding calcium oxide or calcium hydroxide to the mercury- and selenium-contaminated waste water, c) separating BaSO$_4$ from the mercury- and selenium-contaminated waste water to obtain a low-solid waste water, d) feeding the low-solid waste water to an ion exchanger for the removal of mercury to obtain a waste water having a reduced mercury content, and e) removing selenium and/or selenium compounds from the waste water having a reduced mercury content.

2. A method for removing mercury and selenium from sulfate-containing waste water according to claim 1, wherein the defined amount of Ba$^{2+}$ ions is added to the waste water in one or more parts over a period of time.

3. A method for removing mercury and selenium from sulfate-containing waste water according to claim 2, wherein BaSO$_4$ is separated after the addition of Ba$^{2+}$ ions.

4. A method for removing mercury and selenium from sulfate-containing waste water according to claim 3, wherein after the addition of the defined amount of Ba$^{2+}$ ions, calcium oxide or calcium hydroxide is added to adjust the pH to between 11 and 12.5.

5. A method for removing mercury and selenium from sulfate-containing waste water according to claim 3, wherein in step e) selenium is removed from the waste water with a reduced mercury content by
   e1) adding an iron mixture to the waste water having a reduced mercury content,
   e2) subsequently adjusting the pH value to between 6 and 8.5, and
   e3) separating selenium or selenium-containing compounds.

6. A method for removing mercury and selenium from sulfate-containing waste water according to claim 3, wherein in step e) selenium is removed from waste water having a reduced mercury content by passing the waste water having a reduced mercury content through an alkaline ion exchanger, in which selenoxo ions become bound to media of the ion exchange.

7. A method for removing mercury and selenium from sulfate-containing waste water according to claim 3, wherein a flocculant comprising polyacrylamide is added in steps b) and/or step e).

8. A method for removing mercury and selenium from sulfate-containing waste water according to claim 3, wherein a sulfate-containing solution or sulfate-containing solid is added to the waste water in a step f) in order to precipitate any remaining barium residuals as barium sulfate.

9. A method for removing mercury and selenium from sulfate-containing waste water according to claim 3, wherein the waste water from step e) is moved via a pump to an at least one reverse osmosis membrane module in which a separation of the waste water into a permeate with a reduced chloride content and a concentrate with an increased chloride content occurs, and wherein the permeate with the reduced chloride content is returned into the flue gas desulfurization plant.

10. A method for removing mercury and selenium from sulfate-containing waste water according to claim 2, wherein after the addition of the defined amount of Ba$^{2+}$ ions, calcium oxide or calcium hydroxide is added to adjust the pH to between 11 and 12.5.

11. A method for removing mercury and selenium from sulfate-containing waste water according to claim 10, wherein in step e) selenium is removed from the waste water having a reduced mercury content by
   e1) adding an iron mixture to the waste water having a reduced mercury content,
   e2) subsequently adjusting the pH value to between 6 and 8.5, and
   e3) separating selenium or selenium-containing compounds.

12. A method for removing mercury and selenium from sulfate-containing waste water according to claim 2, wherein in step e) selenium is removed from the waste water having a reduced mercury content by
   e1) adding an iron mixture to the waste water having a reduced mercury content,
   e2) subsequently adjusting the pH value to between 6 and 8.5, and
   e3) separating selenium or selenium-containing compounds.

13. A method for removing mercury and selenium from sulfate-containing waste water according to claim 2, wherein in step e) selenium is removed from waste water having a reduced mercury content by passing the waste water having a reduced mercury content through an alkaline ion exchanger, in which selenoxo ions become bound to media of the ion exchange.

14. A method for removing mercury and selenium from sulfate-containing waste water according to claim 2, wherein a flocculant comprising polyacrylamide is added in steps b) and/or step e).

15. A method for removing mercury and selenium from sulfate-containing waste water according to claim 2, wherein a sulfate-containing solution or sulfate-containing solid is added to the waste water in a step f) in order to precipitate any remaining barium residuals as barium sulfate.

16. A method for removing mercury and selenium from sulfate-containing waste water according to claim 2, wherein the waste water from step e) is moved via a pump to an at least one reverse osmosis membrane module in which a separation of the waste water into a permeate with a reduced chloride content and a concentrate with an increased chloride content occurs, and wherein the permeate with the reduced chloride content is returned into the flue gas desulfurization plant.

17. A method for removing mercury and selenium from sulfate-containing waste water according to claim 1, wherein the defined amount of Ba$^{2+}$ ions is added as a plurality of parts at different process positions along a stream of the mercury- and selenium-contaminated waste water.

18. A method for removing mercury and selenium from sulfate-containing waste water according to claim 17, wherein BaSO$_4$ is separated after the addition of one or more parts of Ba$^{2+}$ ions.

19. A method for removing mercury and selenium from sulfate-containing waste water according to claim 18, wherein in step e) selenium is removed from the waste water having a reduced mercury content by
   e1) adding an iron mixture to the waste water having a reduced mercury content,
   e2) subsequently adjusting the pH value to between 6 and 8.5, and
   e3) separating selenium or selenium-containing compounds.

20. A method for removing mercury and selenium from sulfate-containing waste water according to claim 17, wherein after the addition of the defined amount of $Ba^{2+}$ ions, calcium oxide or calcium hydroxide is added to adjust the pH to between 11 and 12.5.

21. A method for removing mercury and selenium from sulfate-containing waste water according to claim 17, wherein in step e) selenium is removed from the waste water having a reduced mercury content by
   e1) adding an iron mixture to the waste water having a reduced mercury content,
   e2) subsequently adjusting the pH value to between 6 and 8.5, and
   e3) separating selenium or selenium-containing compounds.

22. A method for removing mercury and selenium from sulfate-containing waste water according to claim 17, wherein in step e) selenium is removed from waste water having a reduced mercury content by passing the waste water having a reduced mercury content through an alkaline ion exchanger, in which selenoxo ions become bound to media of the ion exchange.

23. A method for removing mercury and selenium from sulfate-containing waste water according to claim 17, wherein a flocculant comprising polyacrylamide is added in steps b) and/or step e).

24. A method for removing mercury and selenium from sulfate-containing waste water according to claim 17, wherein a sulfate-containing solution or sulfate-containing solid is added to the waste water in a step f) in order to precipitate any remaining barium residuals as barium sulfate.

25. A method for removing mercury and selenium from sulfate-containing waste water according to claim 17, wherein the waste water from step e) is moved via a pump to an at least one reverse osmosis membrane module in which a separation of the waste water into a permeate with a reduced chloride content and a concentrate with an increased chloride content occurs, and wherein the permeate with the reduced chloride content is returned into the flue gas desulfurization plant.

26. A method for removing mercury and selenium from sulfate-containing waste water according to claim 1, wherein after the addition of the defined amount of $Ba^{2+}$ ions, calcium oxide or calcium hydroxide is added to adjust the pH to between 11 and 12.5.

27. A method for removing mercury and selenium from sulfate-containing waste water according to claim 26, wherein the pH is adjusted to about 11 to 12.5 by adding a calcium hydroxide-containing solution.

28. A method for removing mercury and selenium from sulfate-containing waste water according to claim 27, wherein in step e) selenium is removed from waste water having a reduced mercury content by passing the waste water having a reduced mercury content through an alkaline ion exchanger, in which selenoxo ions become bound to media of the ion exchange.

29. A method for removing mercury and selenium from sulfate-containing waste water according to claim 27, wherein a flocculant comprising polyacrylamide is added in steps b) and/or step e).

30. A method for removing mercury and selenium from sulfate-containing waste water according to claim 27, wherein a sulfate-containing solution or sulfate-containing solid is added to the waste water in a step f) in order to precipitate any remaining barium residuals as barium sulfate.

31. A method for removing mercury and selenium from sulfate-containing waste water according to claim 27, wherein the waste water from step e) is moved via a pump to an at least one reverse osmosis membrane module in which a separation of the waste water into a permeate with a reduced chloride content and a concentrate with an increased chloride content occurs, and wherein the permeate with the reduced chloride content is returned into the flue gas desulfurization plant.

32. A method for removing mercury and selenium from sulfate-containing waste water according to claim 26, wherein the pH is adjusted to about 11 to 12.5 by using $Ca(OH)_2$.

33. A method for removing mercury and selenium from sulfate-containing waste water according to claim 32, wherein in step e) selenium is removed from waste water having a reduced mercury content by passing the waste water having a reduced mercury content through an alkaline ion exchanger, in which selenoxo ions become bound to media of the ion exchange.

34. A method for removing mercury and selenium from sulfate-containing waste water according to claim 32, wherein a flocculant comprising polyacrylamide is added in steps b) and/or step e).

35. A method for removing mercury and selenium from sulfate-containing waste water according to claim 32, wherein a sulfate-containing solution or sulfate-containing solid is added to the waste water in a step f) in order to precipitate any remaining barium residuals as barium sulfate.

36. A method for removing mercury and selenium from sulfate-containing waste water according to claim 32, wherein the waste water from step e) is moved via a pump to an at least one reverse osmosis membrane module in which a separation of the waste water into a permeate with a reduced chloride content and a concentrate with an increased chloride content occurs, and wherein the permeate with the reduced chloride content is returned into the flue gas desulfurization plant.

37. A method for removing mercury and selenium from sulfate-containing waste water according to claim 26, wherein in step e) selenium is removed from the waste water having a reduced mercury content by
   e1) adding an iron mixture to the waste water having a reduced mercury content,
   e2) subsequently adjusting the pH value to between 6 and 8.5, and
   e3) separating selenium or selenium-containing compounds.

38. A method for removing mercury and selenium from sulfate-containing waste water according to claim 26, wherein in step e) selenium is removed from waste water having a reduced mercury content by passing the waste water having a reduced mercury content through an alkaline ion exchanger, in which selenoxo ions become bound to media of the ion exchange.

39. A method for removing mercury and selenium from sulfate-containing waste water according to claim 26, wherein a flocculant comprising polyacrylamide is added in steps b) and/or step e).

40. A method for removing mercury and selenium from sulfate-containing waste water according to claim 26, wherein a sulfate-containing solution or sulfate-containing solid is added to the waste water in a step f) in order to precipitate any remaining barium residuals as barium sulfate.

41. A method for removing mercury and selenium from sulfate-containing waste water according to claim 26, wherein the waste water from step e) is moved via a pump to an at least one reverse osmosis membrane module in which a separation of the waste water into a permeate with a reduced chloride content and a concentrate with an increased chloride content occurs, and wherein the permeate with the reduced chloride content is returned into the flue gas desulfurization plant.

42. A method for removing mercury and selenium from sulfate-containing waste water according to claim 1, wherein in step e) selenium is removed from the waste water having a reduced mercury content by
   e1) adding an iron mixture to the waste water having a reduced mercury content,
   e2) subsequently adjusting the pH value to between 6 and 8.5, and
   e3) separating selenium or selenium-containing compounds.

43. A method for removing mercury and selenium from sulfate-containing waste water according to claim 42, wherein Fe (0), and Fe (II) and Fe (III) compounds are added to the waste water having a reduced mercury content.

44. A method for removing mercury and selenium from sulfate-containing waste water according to claim 43, wherein Fe (0), $FeCl_2$ and $FeCl_3$ are added to the waste water having a reduced mercury content.

45. A method for removing mercury and selenium from sulfate-containing waste water according to claim 44, wherein an aqueous suspension of Fe (0), $FeCl_2$ and $FeCl_3$ in a weight ratio of 1:10:10 is added to the waste water having a reduced mercury content.

46. A method for removing mercury and selenium from sulfate-containing waste water according to claim 45, wherein the pH value is adjusted by the addition of calcium oxide or calcium hydroxide.

47. A method for removing mercury and selenium from sulfate-containing waste water according to claim 45, wherein in step e) selenium is removed from waste water having a reduced mercury content by passing the waste water having a reduced mercury content through an alkaline ion exchanger, in which selenoxo ions become bound to media of the ion exchange.

48. A method for removing mercury and selenium from sulfate-containing waste water according to claim 45, wherein a flocculant comprising polyacrylamide is added in steps b) and/or step e).

49. A method for removing mercury and selenium from sulfate-containing waste water according to claim 45, wherein a sulfate-containing solution or sulfate-containing solid is added to the waste water in a step f) in order to precipitate any remaining barium residuals as barium sulfate.

50. A method for removing mercury and selenium from sulfate-containing waste water according to claim 45, wherein the waste water from step e) is moved via a pump to an at least one reverse osmosis membrane module in which a separation of the waste water into a permeate with a reduced chloride content and a concentrate with an increased chloride content occurs, and wherein the permeate with the reduced chloride content is returned into the flue gas desulfurization plant.

51. A method for removing mercury and selenium from sulfate-containing waste water according to claim 44, wherein the pH value is adjusted by the addition of calcium oxide or calcium hydroxide.

52. A method for removing mercury and selenium from sulfate-containing waste water according to claim 51, wherein a flocculant comprising polyacrylamide is added in steps b) and/or step e).

53. A method for removing mercury and selenium from sulfate-containing waste water according to claim 51, wherein a sulfate-containing solution or sulfate-containing solid is added to the waste water in a step f) in order to precipitate any remaining barium residuals as barium sulfate.

54. A method for removing mercury and selenium from sulfate-containing waste water according to claim 51, wherein the waste water from step e) is moved via a pump to an at least one reverse osmosis membrane module in which a separation of the waste water into a permeate with a reduced chloride content and a concentrate with an increased chloride content occurs, and wherein the permeate with the reduced chloride content is returned into the flue gas desulfurization plant.

55. A method for removing mercury and selenium from sulfate-containing waste water according to claim 44, wherein in step e) selenium is removed from waste water having a reduced mercury content by passing the waste water having a reduced mercury content through an alkaline ion exchanger, in which selenoxo ions become bound to media of the ion exchange.

56. A method for removing mercury and selenium from sulfate-containing waste water according to claim 44, wherein a flocculant comprising polyacrylamide is added in steps b) and/or step e).

57. A method for removing mercury and selenium from sulfate-containing waste water according to claim 44, wherein a sulfate-containing solution or sulfate-containing solid is added to the waste water in a step f) in order to precipitate any remaining barium residuals as barium sulfate.

58. A method for removing mercury and selenium from sulfate-containing waste water according to claim 44, wherein the waste water from step e) is moved via a pump to an at least one reverse osmosis membrane module in which a separation of the waste water into a permeate with a reduced chloride content and a concentrate with an increased chloride content occurs, and wherein the permeate with the reduced chloride content is returned into the flue gas desulfurization plant.

59. A method for removing mercury and selenium from sulfate-containing waste water according to claim 43, wherein the pH value is adjusted by the addition of calcium oxide or calcium hydroxide.

60. A method for removing mercury and selenium from sulfate-containing waste water according to claim 43, wherein in step e) selenium is removed from waste water having a reduced mercury content by passing the waste water having a reduced mercury content through an alkaline ion exchanger, in which selenoxo ions become bound to media of the ion exchange.

61. A method for removing mercury and selenium from sulfate-containing waste water according to claim 43, wherein a flocculant comprising polyacrylamide is added in steps b) and/or step e).

62. A method for removing mercury and selenium from sulfate-containing waste water according to claim 43, wherein a sulfate-containing solution or sulfate-containing solid is added to the waste water in a step f) in order to precipitate any remaining barium residuals as barium sulfate.

63. A method for removing mercury and selenium from sulfate-containing waste water according to claim 43, wherein the waste water from step e) is moved via a pump to an at least one reverse osmosis membrane module in which a separation of the waste water into a permeate with a reduced chloride content and a concentrate with an increased chloride content occurs, and wherein the permeate with the reduced chloride content is returned into the flue gas desulfurization plant.

64. A method for removing mercury and selenium from sulfate-containing waste water according to claim 42, wherein the pH value is adjusted by the addition of calcium oxide or calcium hydroxide.

65. A method for removing mercury and selenium from sulfate-containing waste water according to claim 64, wherein in step e) selenium is removed from waste water having a reduced mercury content by passing the waste water having a reduced mercury content through an alkaline ion exchanger, in which selenoxo ions become bound to media of the ion exchange.

66. A method for removing mercury and selenium from sulfate-containing waste water according to claim 64, wherein a flocculant comprising polyacrylamide is added in steps b) and/or step e).

67. A method for removing mercury and selenium from sulfate-containing waste water according to claim 64, wherein a sulfate-containing solution or sulfate-containing solid is added to the waste water in a step f) in order to precipitate any remaining barium residuals as barium sulfate.

68. A method for removing mercury and selenium from sulfate-containing waste water according to claim 64, wherein the waste water from step e) is moved via a pump to an at least one reverse osmosis membrane module in which a separation of the waste water into a permeate with a reduced chloride content and a concentrate with an increased chloride content occurs, and wherein the permeate with the reduced chloride content is returned into the flue gas desulfurization plant.

69. A method for removing mercury and selenium from sulfate-containing waste water according to claim 42, wherein in step e) selenium is removed from waste water having a reduced mercury content by passing the waste water having a reduced mercury content through an alkaline ion exchanger, in which selenoxo ions become bound to media of the ion exchange.

70. A method for removing mercury and selenium from sulfate-containing waste water according to claim 42, wherein a flocculant comprising polyacrylamide is added in steps b) and/or step e).

71. A method for removing mercury and selenium from sulfate-containing waste water according to claim 42, wherein a sulfate-containing solution or sulfate-containing solid is added to the waste water in a step f) in order to precipitate any remaining barium residuals as barium sulfate.

72. A method for removing mercury and selenium from sulfate-containing waste water according to claim 42, wherein the waste water from step e) is moved via a pump to an at least one reverse osmosis membrane module in which a separation of the waste water into a permeate with a reduced chloride content and a concentrate with an increased chloride content occurs, and wherein the permeate with the reduced chloride content is returned into the flue gas desulfurization plant.

73. A method for removing mercury and selenium from sulfate-containing waste water according to claim 1, wherein in step e) selenium is removed from waste water having a reduced mercury content by passing the waste water having a reduced mercury content through an alkaline ion exchanger, in which selenoxo ions become bound to media of the ion exchange.

74. A method for removing mercury and selenium from sulfate-containing waste water according to claim 1, wherein a flocculant comprising polyacrylamide is added in steps b) and/or step e).

75. A method for removing mercury and selenium from sulfate-containing waste water according to claim 74, wherein a sulfate-containing solution or sulfate-containing solid is added to the waste water in a step f) in order to precipitate any remaining barium residuals as barium sulfate.

76. A method for removing mercury and selenium from sulfate-containing waste water according to claim 74, wherein the waste water from step e) is moved via a pump to an at least one reverse osmosis membrane module in which a separation of the waste water into a permeate with a reduced chloride content and a concentrate with an increased chloride content occurs, and wherein the permeate with the reduced chloride content is returned into the flue gas desulfurization plant.

77. A method for removing mercury and selenium from sulfate-containing waste water according to claim 1, wherein a sulfate-containing solution or sulfate-containing solid is added to the waste water in a step f) in order to precipitate any remaining barium residuals as barium sulfate.

78. A method for removing mercury and selenium from sulfate-containing waste water according to claim 77, wherein the waste water from step e) or step f) is moved via a pump to an at least one reverse osmosis membrane module in which a separation of the waste water into a permeate with a reduced chloride content and a concentrate with an increased chloride content occurs, and wherein the permeate with the reduced chloride content is returned into the flue gas desulfurization plant.

79. A method for removing mercury and selenium from sulfate-containing waste water according to claim 1, wherein the waste water from step e) is moved via a pump to an at least one reverse osmosis membrane module in which a separation of the waste water into a permeate with a reduced chloride content and a concentrate with an increased chloride content occurs, and wherein the permeate with the reduced chloride content is returned into the flue gas desulfurization plant.

80. A method for removing mercury and selenium from sulfate-containing waste water according to claim 1, wherein in step d) and/or e) an adsorbent agent is used to remove the mercury and selenium.

81. A method for removing mercury and selenium from sulfate-containing waste water according to claim 80, wherein the adsorbent agent is selected from the group consisting of activated carbon, activated coke, hearth coke made from bituminous coal (black coal) and lignite coal (brown coal), polyamide, cellulose, zeolites, aluminum silicates, clay minerals and limestone based adsorbent agents, and combinations thereof.

* * * * *